United States Patent [19]
Higashihara et al.

[11] Patent Number: 5,911,088
[45] Date of Patent: Jun. 8, 1999

[54] CAMERA

[75] Inventors: Masaki Higashihara, Kanagawa-ken; Kenitiro Yamashita, Chiba-ken, both of Japan

[73] Assignee: Canon Kabushiki Kaisha, Tokyo, Japan

[21] Appl. No.: 08/951,369

[22] Filed: Oct. 16, 1997

Related U.S. Application Data

[62] Division of application No. 08/311,892, Sep. 26, 1994, abandoned, which is a continuation of application No. 07/889,394, May 28, 1992, abandoned.

[30] Foreign Application Priority Data

May 30, 1991 [JP] Japan .................................. 3-127625
Jun. 20, 1991 [JP] Japan .................................. 3-148863
Jul. 11, 1991 [JP] Japan .................................. 3-171189

[51] Int. Cl.$^6$ ................................................. G03B 17/24
[52] U.S. Cl. .......................................... 396/387; 396/418
[58] Field of Search ................................. 74/89.2, 89.21, 74/89.22, 63, 68; 396/387, 388, 411, 413, 414, 418

[56] References Cited

U.S. PATENT DOCUMENTS

| | | | |
|---|---|---|---|
| 2,196,358 | 4/1940 | Heinisch | 352/35 |
| 3,936,847 | 2/1976 | Erlichman | 354/152 |
| 4,013,352 | 3/1977 | Monroy | 352/35 |
| 4,174,157 | 11/1979 | Gottschack | 352/35 |
| 4,204,759 | 5/1980 | Yamada et al. | 396/358 |
| 4,326,790 | 4/1982 | Hirata et al. | 354/288 |
| 4,327,983 | 5/1982 | Geutebruck et al. | 396/418 |
| 4,536,066 | 8/1985 | Bauer | 352/35 |
| 4,655,099 | 4/1987 | Hansen | 74/421 |
| 4,899,187 | 2/1990 | Alligood | 396/358 |

*Primary Examiner*—David M. Gray
*Attorney, Agent, or Firm*—Fitzpatrick, Cella, Harper & Scinto

[57] ABSTRACT

A camera includes a motor, a structural body arranged to support the motor through an elastic member, and a power transmission mechanism for transmitting the rotation output of the motor to a camera operating mechanism. The power transmission mechanism includes a worm gear secured to the output shaft of the motor, a helical gear engaging the worm gear and a belt arranged to transmit the rotation output of the motor to another rotary member.

4 Claims, 25 Drawing Sheets

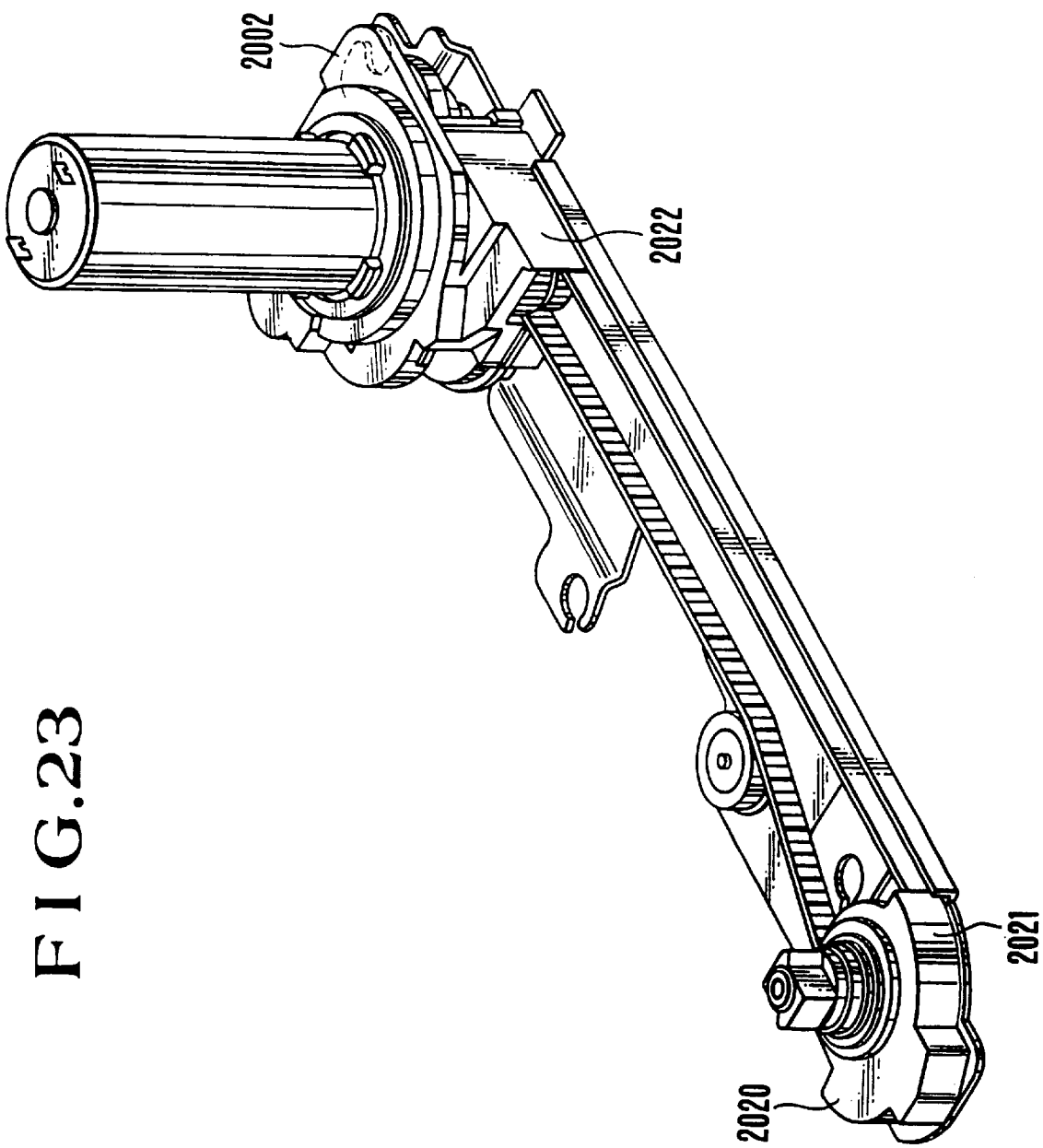

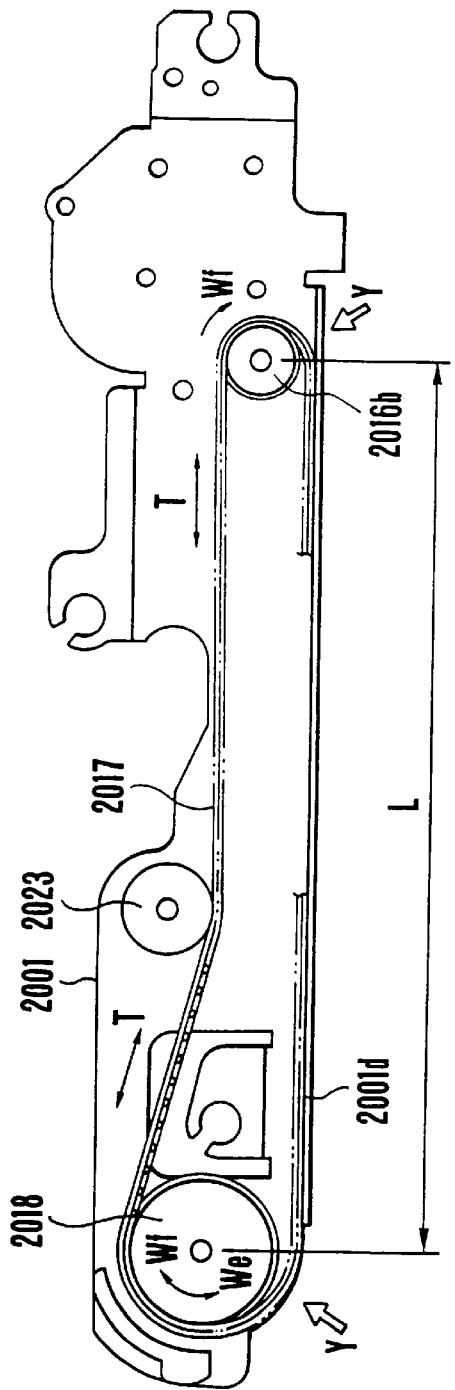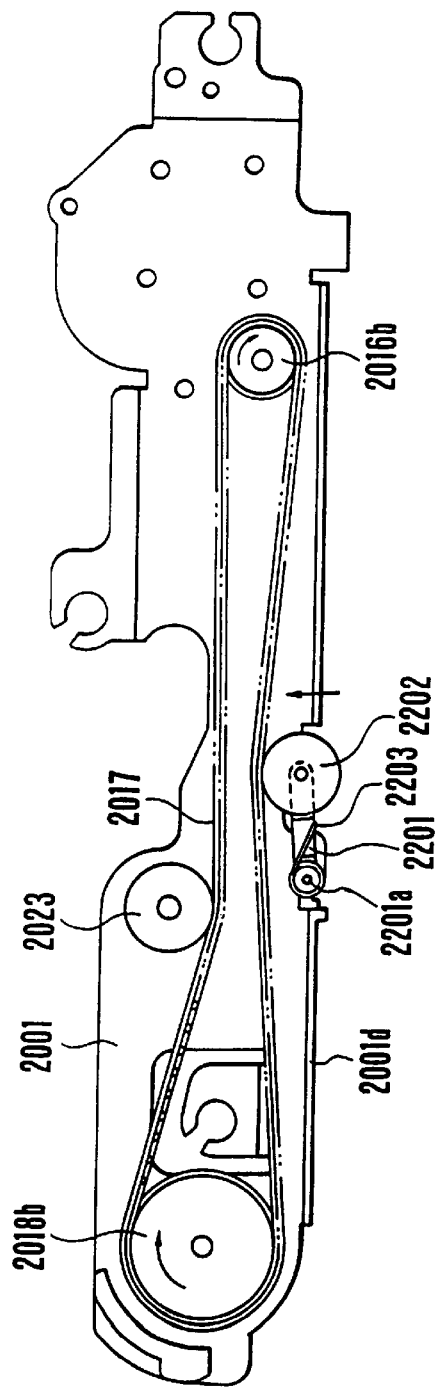

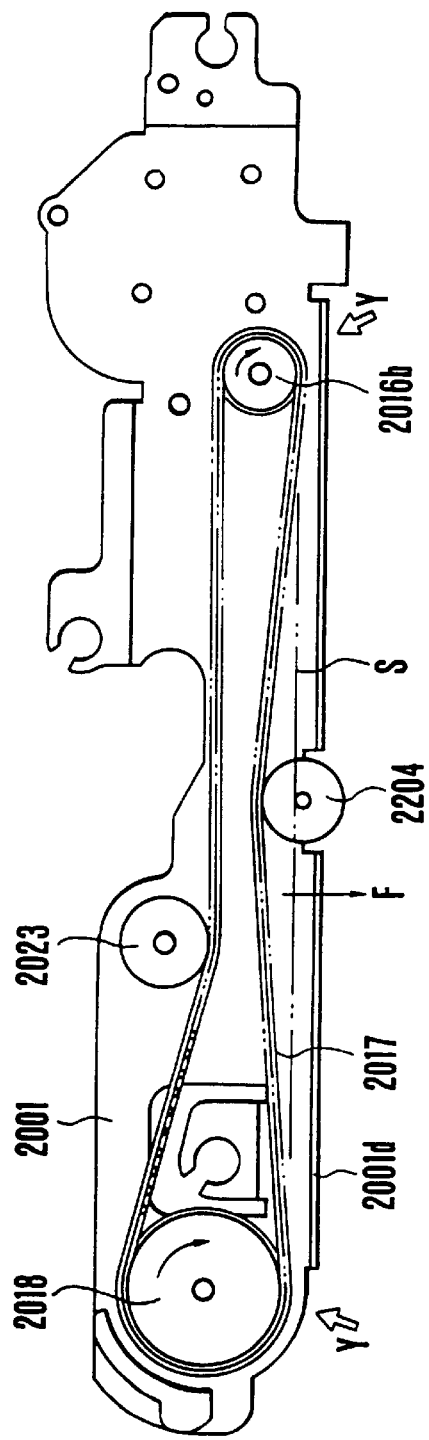
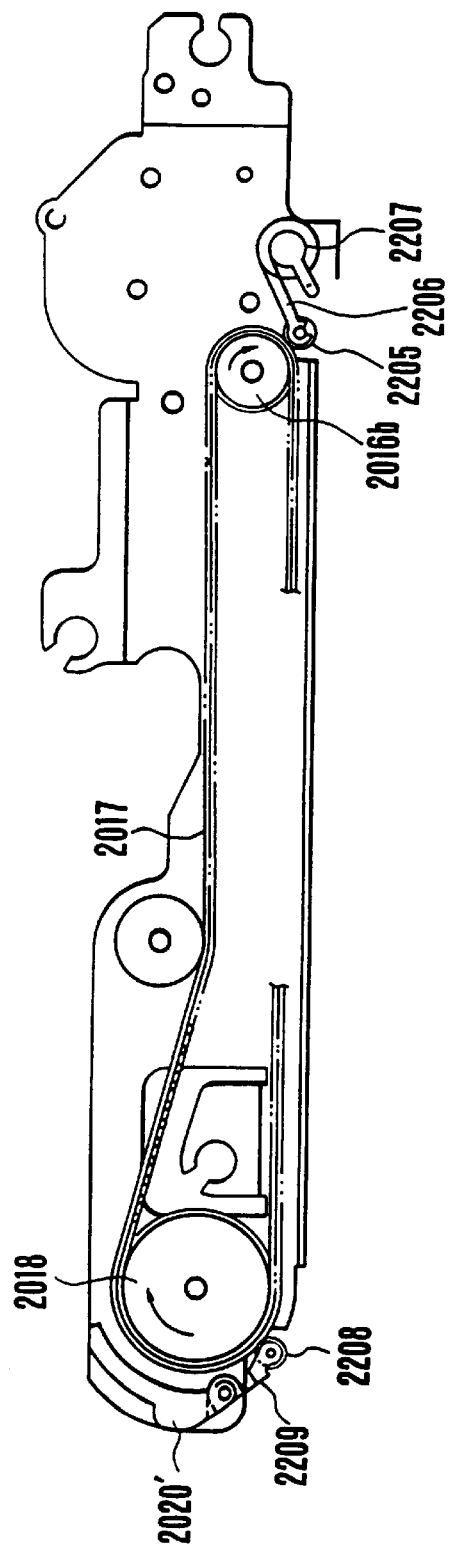

CAMERA

This application is a division of abandoned application Ser. No. 08/311,892, filed Sep. 26, 1994, which is a continuation of Ser. No. 07/889,394 filed May 28, 1992 abandoned.

BACKGROUND OF THE INVENTION

1. Field of the Invention

This invention relates to a camera and more particularly to an improvement in the method of supporting a motor incorporated in a structural body of the camera.

2. Description of the Related Art

The cameras of the kind performing film feeding, shutter charging, and mirror driving actions by means of motors have been proposed. FIG. 2 shows by way of example the arrangement of the conventional single-lens reflex camera for performing shutter charging and mirror driving actions with a motor.

The motor 2 is fixed by screws 3 to a structural member 1 of the camera body. The power (or driving force) of the motor 2 is transmitted to a gear 5 by a pinion gear 4, which is attached to the output shaft 2a of the motor 2. The motor power is moderated through gears 6, 7 and 8, a power transmission shaft 9 and a worm gear 10 before the motor power reaches cam gears 11 and 12.

The cam gear 11 is provided for driving the mirror of the single-lens reflex camera. When the cam gear 11 rotates counterclockwise, the fore end 13a of a lever 13 comes off the cam top of the cam gear 11. Then, the lever 13 is turned counterclockwise to move upward a mirror member (not shown) to a photographing-standby position. At this moment, the cam gear 12, which is provided for charging the shutter of the camera, rotates clockwise. A roller 17b mounted on a lever 17, which is arranged to charge the shutter, then moves from the cam top of the cam gear 12 to the bottom part thereof. Another roller 17a of the lever 17 moves downward from a shutter-charging-completed position to a photographing-standby position. A photograph can be taken by stopping the motor 2 under this condition. After that, the mirror is caused to move downward by restarting the motor 2 to rotate the cam gear 11 counterclockwise and causing the lever 13 to turn clockwise. At the same time, the shutter charged with the lever 17 is caused to turn counterclockwise to move the roller 17a upward by rotating the cam gear 12 clockwise.

The power transmission mechanism of the camera, which is arranged in this manner, however, has presented a problem in that the vibrations of the motor are transmitted to structural members and thus cause vibrations and noises of the camera, because the motor 2 is fixed directly to the structural member 1 in the camera body.

It has been known that many cameras are provided with a built-in electric motor for film feeding with the driving force of the motor. In these cameras, the parts included in such a driving system are all attached directly to a structural body with screws or the like as discrete parts or units.

FIG. 16 is an oblique view showing by way of example a camera having a film feeding mechanism arranged to be driven by a motor. FIG. 17 is a sectional view showing how essential parts are arranged in the mechanism. A driving unit 1201 consists of a small motor, which is a drive source, and all the speed-reduction and power-transmission mechanisms. The driving unit 1201 is secured by several screws 1202 to a camera body 1200, which is the structural body of the camera. An upper base plate 1106 is secured by screws to the upper part of a spool chamber 1200a which is formed in the body 1200. A spool 1204 is disposed within the spool chamber 1200a and is arranged to be rotatable on the same axis as a gear 1214 of the driving unit 1201 with the spool 1204 fittingly engaged with a boss 1106a of the upper base plate 1106 and a claw 1214a formed on the gear 1214. The movement of the spool 1204 in the direction of thrust is restricted by the upper base plate 1106 and the gear 1214.

Many camera parts in recent years are made of plastics for reduction in weight and cost. The structural body such as the above-stated camera body 1200 is mostly made of a plastic material instead of zinc or aluminum.

With the driving unit 1201 attached directly to the body 1200 as in the case of FIG. 16, vibrations generated by the motor 1003 and the speed-reduction mechanism are transferred directly to the body 1200 when the driving unit 1201 is in action. In a case where the body 1200 is made of a plastic material in a complex shape, in particular, the vibrations tend to bring forth unpleasant noises.

Therefore, it has been contrived, as one of means for reducing such noises of the camera, to insert a vibration absorber having a low Young's modulus such as butyl rubber between the body 1200 and the driving unit 1201. However, the use of the vibration absorber makes it difficult to reliably keep the driving unit 1201 in position. Under a film feeding load, the driving unit 1201 tends to vibrate by deforming the vibration absorber. If a harder vibration absorber is used to prevent the deformation, the effect of preventing the transfer of vibration would be lowered.

With the spool 1204 arranged to be set in place simply by the gear 1214 of the driving unit 1201 and the upper base plate 1106, therefore, the axis of rotation of the spool 1204 becomes unstable due to the load and driving force applied to the spool 1204 at the time of film feeding, and a film winding action might not be adequately accomplished.

FIG. 25 shows by way of example another camera having a driving unit provided with a timing belt. In FIG. 25, a reference numeral 2101' denotes the driving unit. The driving unit 2101' includes a small motor which serves as a drive source and has all the speed-reduction and transmission functions for the power of the motor. The driving unit 2101 is mounted on the body 2100 of the camera in one unified body. The gear 2014 of the driving unit 2101' is arranged to be fitted on a spool 2104 and to transmit a film winding driving force to the spool 2104. A film rewinding fork 2019 protrudes into a film cartridge chamber 2100b and is arranged to be constantly engaging a projection provided within a cartridge shaft 2113 with the cartridge 2114 in a loaded state.

When the driving unit 2101' is winding the film 2112, the driving force of the motor 2003 is moderated by a gear train (not shown) mounted on a gear base plate 2002. The driving force is transmitted to the gear 2014 after the output direction of the driving force is switched by a planetary gear mechanism (not shown).

Therefore, the spool 2104 is rotated in the direction of arrow Wd. The film 2112 is gradually taken up onto the periphery of the spool 2104 with its perforation hole 2112a hooked by the claws 2104a of the spool 2104.

When the driving unit 2101' is in a rewinding condition, the planetary gear mechanism transmits the driving force of a motor 2003 to a gear 2016a. A pulley 2016b is formed in one unified body with the gear 2016a. The driving force is transmitted to a pulley 2018 through a timing belt 2017, which is put on the pulley 2016b. The above-stated fork 2019 engages the pulley 2018 and is arranged to rotate together with the pulley 2018. The film 2112 can be stowed inside the cartridge 2114 by rotating the cartridge shaft 2113 in the direction of arrow Wf.

In the case of the arrangement shown in FIG. 25, the cartridge shaft 2113 is caused by the tensile force of the film 2112 to rotate in the direction of arrow We when winding the film. However, a series of gear train from the pulley 2018 to a part at which disengagement is caused by the planetary gear mechanism including the timing belt 2017 acts as a load on the cartridge shaft 2113 which engages the fork 2019.

Without keeping the blank (unloaded) rotation torque of the above-stated part low, therefore, the arrangement would bring forth a large consumption current at the time of film winding. Film feeding might become impossible in the worst case. In a case where a timing belt is used, in particular, it must be taken into consideration that the load on the rotating force is greatly influenced by a belt stretching force called an initial tension. FIG. 26 shows in a plan view the layout of the pulleys 2016b and 2018 and the timing belt 2017. The initial tension can be lowered by setting a distance L between axes at a shorter distance than a theoretical distance computed from the layout of the pulleys and the peripheral length of the belt 2017. However, if the timing belt 2017 is used in a very slack state, the actual application of a driving force to the belt tends to bring about the following problem:

Referring to FIG. 26, when a driving force is applied to the pulley 2016b in the direction of arrow Wf in rewinding the film, a tension T is generated on one side of the belt 2017 on which an idler 2023 is disposed, i.e., on the so-called driving side of the timing belt 2017. However, since no driving force is exerted on the other side of the timing belt 2017, no tension arises there. As a result, slackness arises at a belt part where the timing belt 2017 engages the pulley 2018 as indicated with an arrow Y. This phenomenon more saliently arises accordingly as the tension T is increased by a load on the pulley 2018 and is, of course, more apt to arise accordingly as the initial tension of the timing belt 2017 is weaker.

When the slack at the part engaging the pulley 2018 becomes excessive, the number of engaging teeth of the pulleys 2016b and 2018 with the timing belt 2017 decreases, so that the engaging parts of them come to disengage becoming no longer capable of bearing the driving force, and there takes place the so-called tooth slippage.

FIG. 27 shows one example of the arrangement of preventing the tooth slippage, which is generally employed. In this case, a tension is given also on the slackening side of the timing belt 2017 by applying the urging force of a spring 2203 to a roller 2202 in the direction of arrow so that the tooth slippage can be prevented. This arrangement is, however, not adoptable because it is against the theme of lowering the initial tension mentioned in the foregoing.

FIG. 28 shows another example of the arrangement of preventing the tooth slippage, which is generally employed. In that case, a fixed roller 2204 is disposed on the inner side of a tangential line S, which connects the outer peripheral parts of both ends of the timing belt 2017. The provision of the roller 2204 effectively prevents the timing belt 2017 from slackening in the direction of arrow F, so that the amount of slackening at the part indicated by the arrow Y can be lessened more effectively than the example shown in FIG. 26.

However, the total length of the timing belt 2017 varies due to unevenness of manufacture and changes of temperature. It is extremely difficult to find such a layout that is apposite to the above-stated roller 2204 and yet allows to have a low initial tension. Besides, it is possible in some cases that the initial tension might be increased by the roller 2204. Therefore, that arrangement is also hardly adoptable.

FIG. 29 shows a further example of the art for preventing the tooth slippage in a manner different from the arrangement shown in FIGS. 27 and 28. Referring to FIG. 29, rollers 2205 and 2208 are arranged to push the timing belt 2017 from outside in the direction of normal lines at parts where the timing belt 2017 engages the pulleys 2016b and 2018 and where a slack takes place at the time of driving, so that the timing belt 2017 can be prevented from disengaging at the time of driving. The rollers 2205 and 2208 are urged to push the timing belt 2017 by a torsion spring 2207 and a leaf spring 2209 or the like.

In accordance with this arrangement, the layout of the rollers can be made with the initial tension of the timing belt 2017 set at a fairly low value, because the initial tension is not affected by the arrangement at all.

However, since the timing belt 2017 is pushed by the rollers 2205 and 2208, some load is imposed on the force of rotation. In addition to that, the arrangement causes an increase in the number of component parts, which is undesirable in terms of a reduction in cost.

SUMMARY OF THE INVENTION

This invention is directed to the solution of the problem that a motor incorporated in a camera body brings about noises and vibrations.

It is, therefore, an object of the invention to provide a motor power transmission mechanism which is arranged within a camera to be capable of reliably transmitting the output of a motor without transmitting the vibrations and noises produced in the motor.

It is another object of the invention to provide a camera wherein a motor is arranged to be supported by a structural member of the camera body through an elastic member; a worm gear is provided on the output shaft of the motor; and the driving force of the motor is transmitted by causing the worm gear to engage a helical gear.

It is a further object of the invention to provide a camera wherein a film winding spool is secured to a camera body unit in an independently rotatable state; and a driving unit including a film feeding motor and a gear train is mounted on the camera body unit through a vibration absorber.

These and other objects and aspects of this invention will become apparent from the following detailed description of embodiments thereof taken in connection with the accompanying drawings.

BRIEF DESCRIPTION OF THE DRAWINGS

FIG. 23 is an oblique view showing a seventh embodiment of the invention.

FIG. 26 shows the details of a part of FIG. 25.

FIG. 27 is a plan view showing another example of the art serving as the premise of the invention.

FIG. 28 is a plan view showing a further example of the art serving as the premise of the invention.

FIG. 29 is a plan view showing a still further example of the art serving as the premise of the invention.

DETAILED DESCRIPTION OF THE PREFERRED EMBODIMENTS

Figure 1:
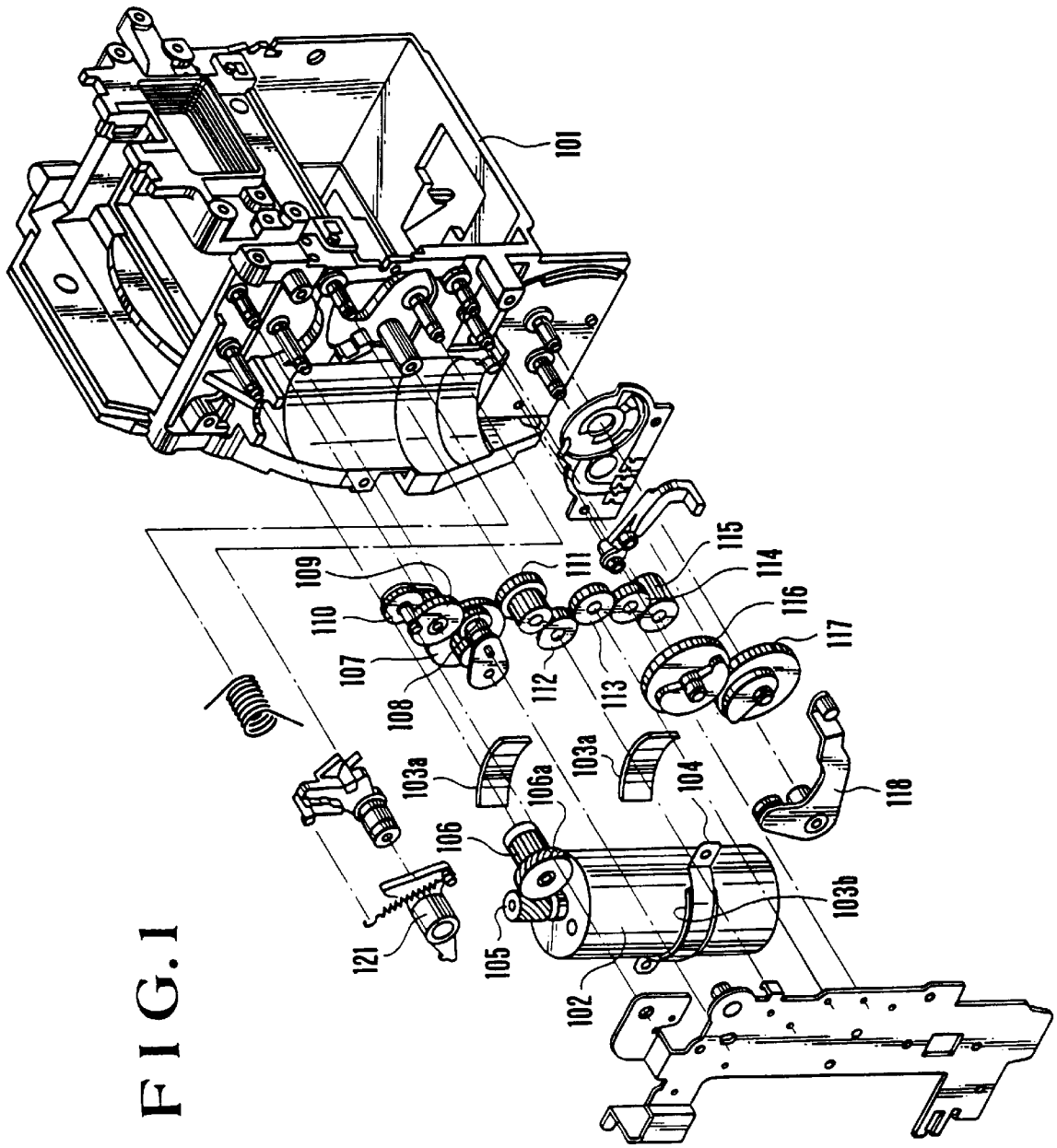
FIG. 1 is an exploded oblique view showing a power transmission mechanism of a camera arranged as a first embodiment of the invention.
Figure 2:
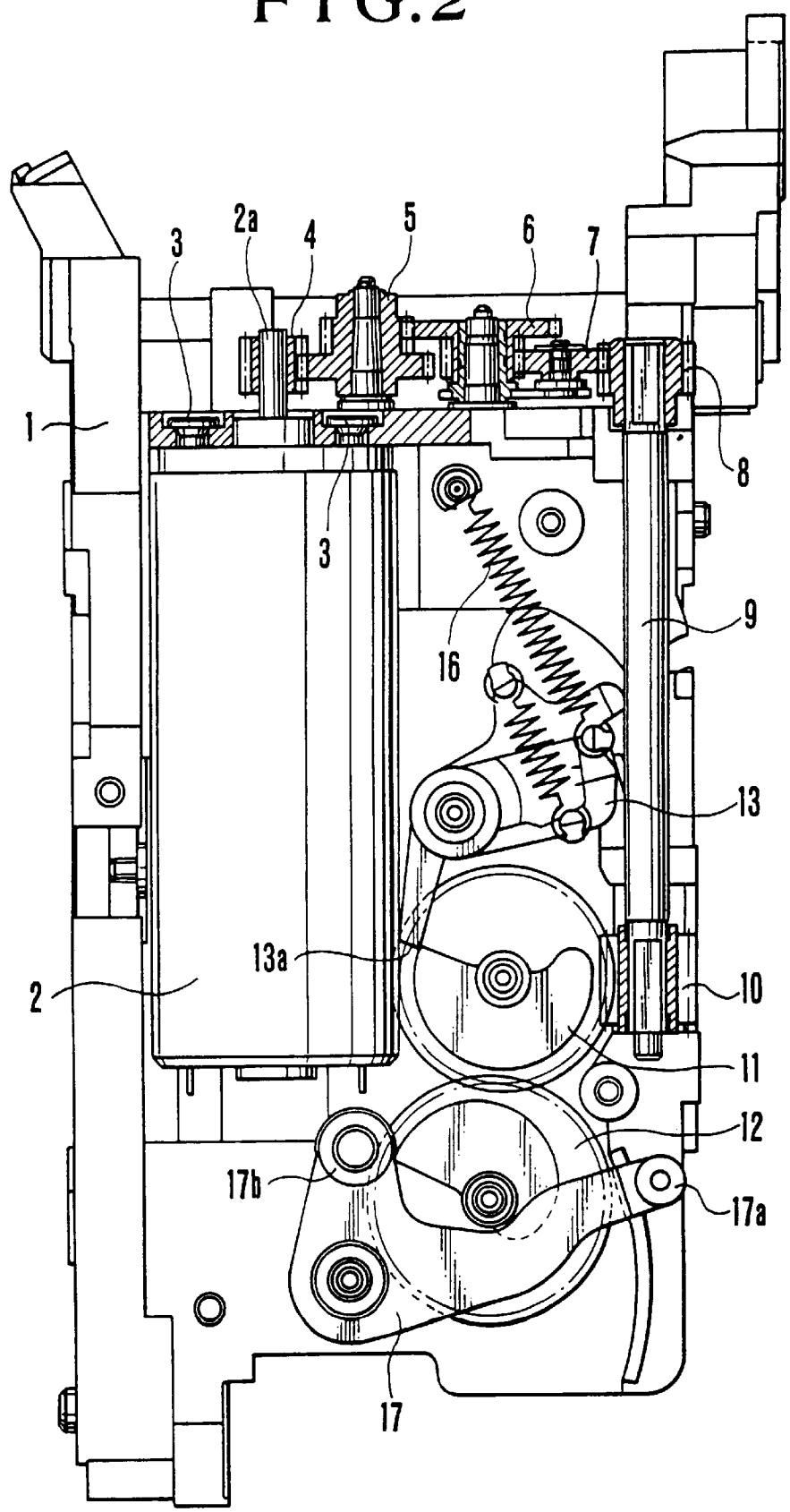
FIG. 2 is a sectional view showing the power transmission mechanism of the conventional camera.
Figure 3:
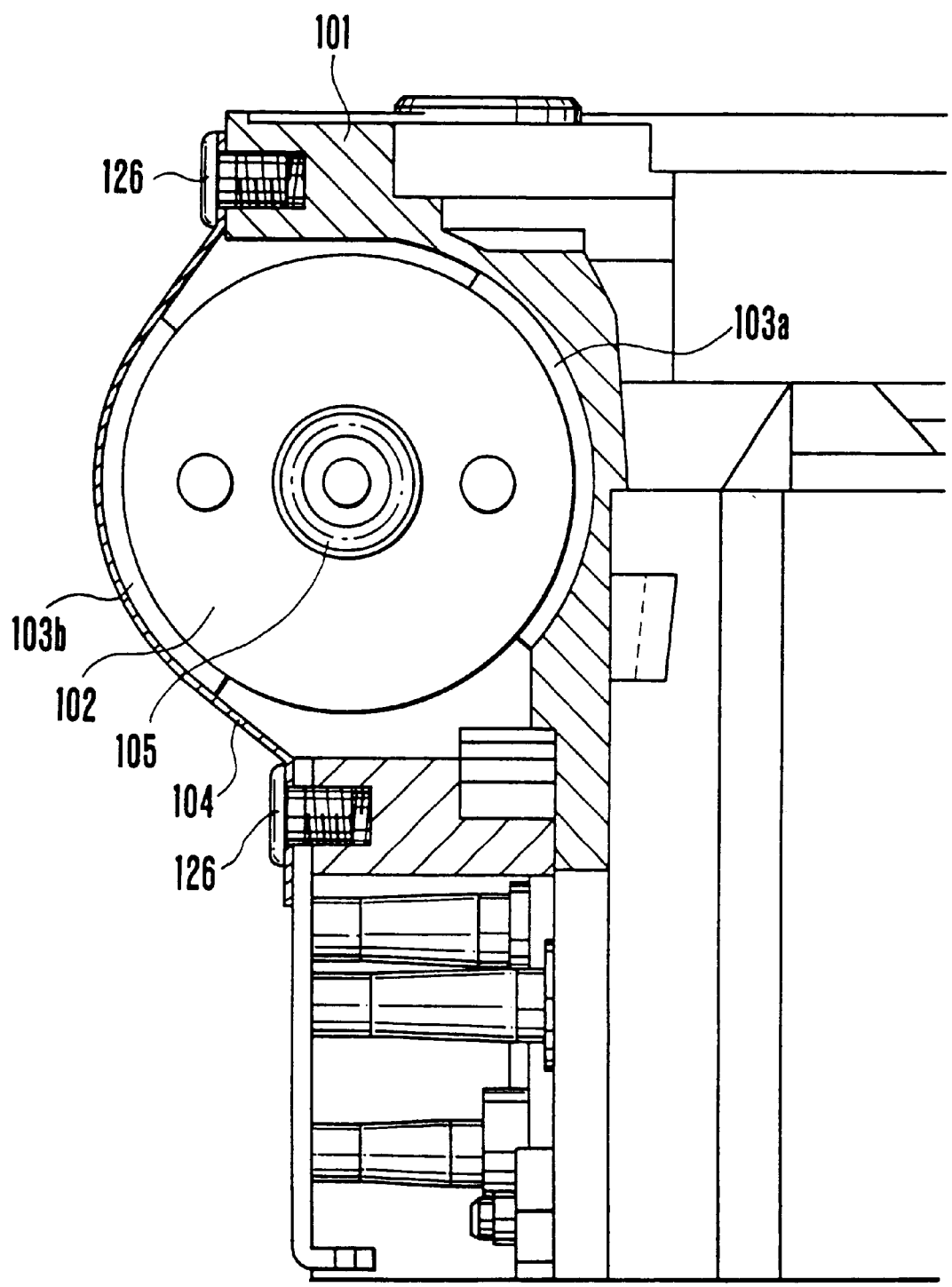
FIG. 3 is a sectional view showing a motor of FIG. 1 in a mounted state.
Figure 4:
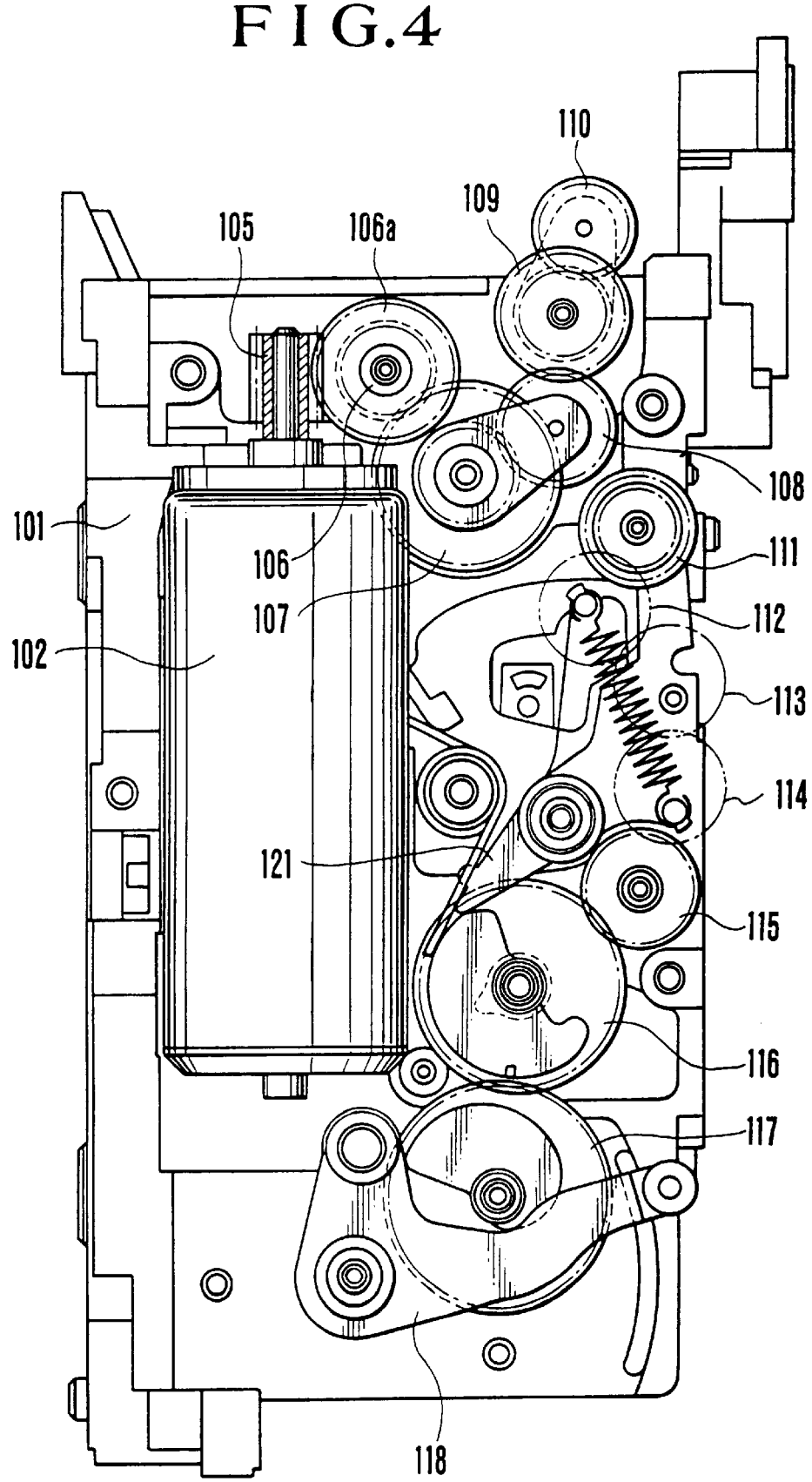
FIG. 4 is a side view of the mechanism shown in FIG. 1.

FIGS. 1, 3 and 4 show a first embodiment of the invention. Referring to these figures, double-sided adhesive tapes 103a and 103b which have elasticity are used to stick and fix a motor 102 to a side wall of a structural member 101 which forms a mirror box in a camera body. The motor 102 is thus stuck and fixed to the structural member 101 through the elastic double-sided adhesive tape 103a and is further pushed by means of a belt 104 through the double-sided adhesive tape 103b in such a way as to prevent the motor 102 from coming into contact directly with any structural member of the camera body. This belt 104 is secured by screws 126 to the structural member 101.

A worm gear 105 is attached to the output shaft of the motor 102 and is arranged to transmit the motor power (driving force) by engaging a helical gear 106a. The motor power is transmitted to cam gears 116 and 117 via gears 106 to 115. A mirror driving action is performed through the cam gear 116. A shutter charging action is performed through the cam gear 117.

FIG. 4 shows, in a side view, each of driving systems in an assembled state. The driving force of the output shaft of the motor 102 is transmitted from the worm gear 105 attached to the output shaft to the helical gear 106a and is then transmitted to the cam gears 116 and 117 via the gears 106 to 115. The cam gear 116 drives a lever 121 to move up and down a mirror which is not shown. The cam gear 117 drives a lever 118 to charge the shutter (not shown). These actions are performed in known manners. Therefore, the detailed description of them are omitted here. Since the motor 102 is supported through the double-sided adhesive tapes 103a and 103b which are made of an elastic material, the axis position of the output shaft of the motor 102 fluctuates. However, since the output shaft of the motor 102 is in connection with the gear train with the worm gear 105 engaged with the helical gear 106a, the output of the motor 102 is transmitted without fail to the gear train.

Figure 6:
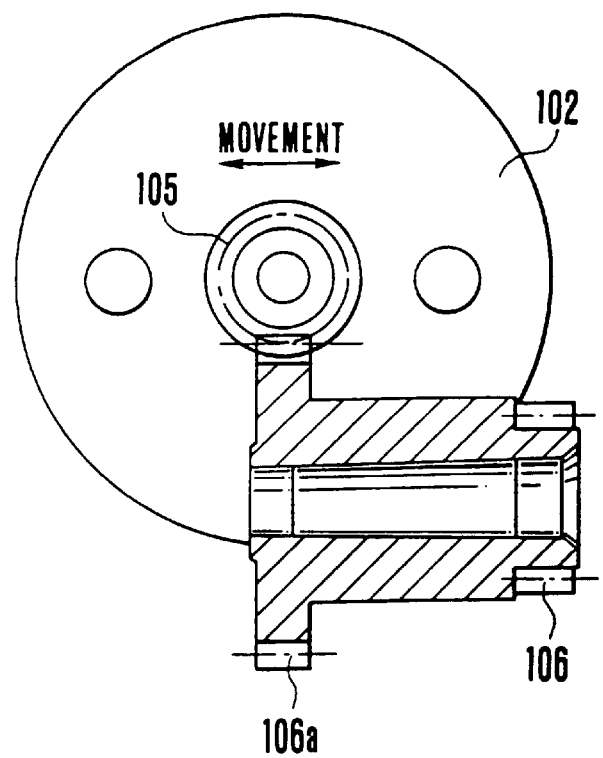
FIG. 6 shows a worm gear and a helical gear in an engaged state.
Figure 7:
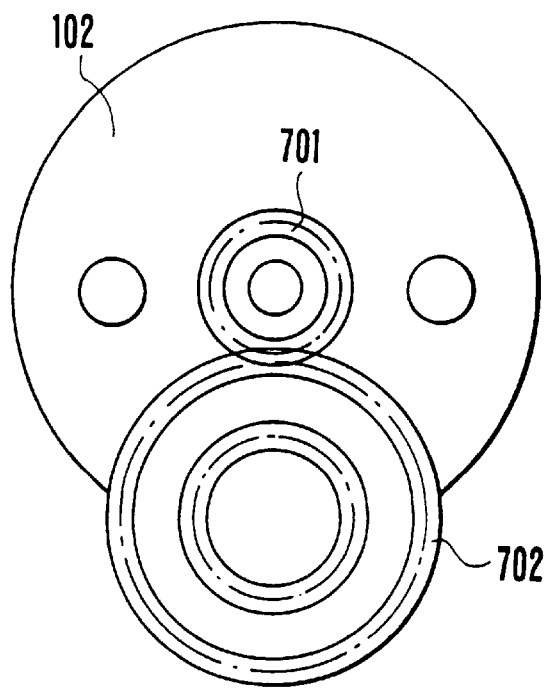
FIG. 7 shows a spur gear in an engaged state.
Figure 8:
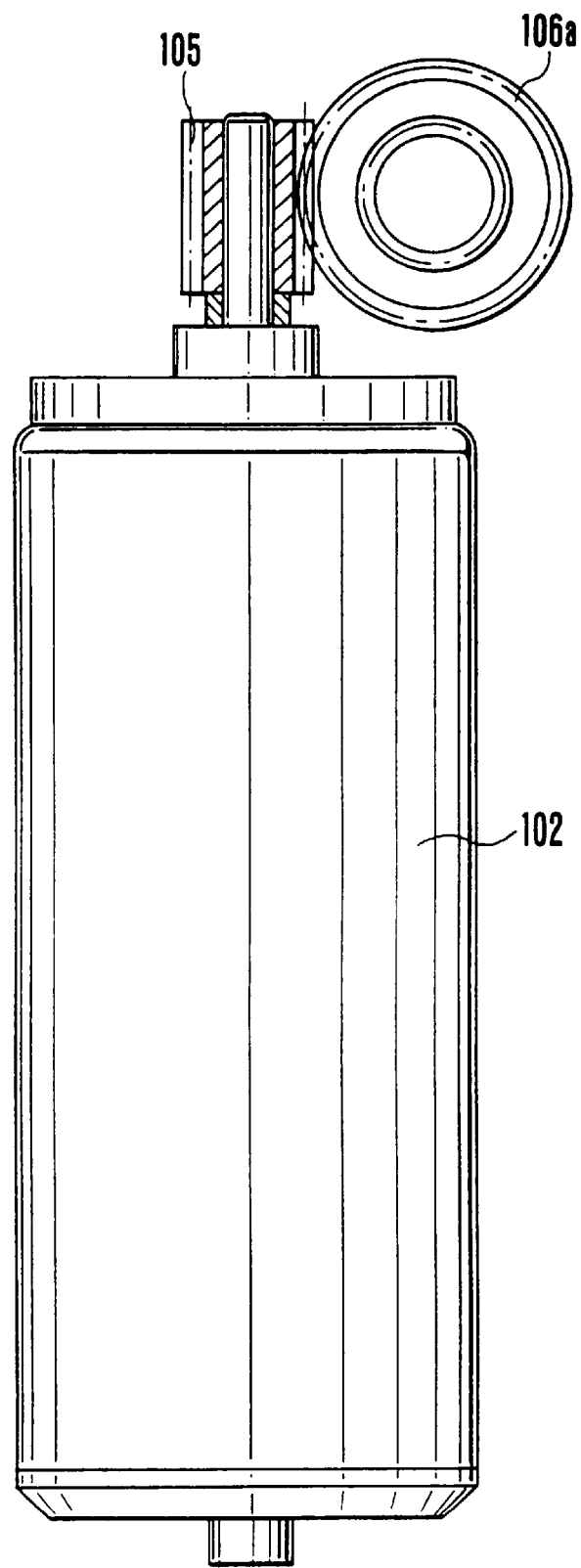
FIG. 8 shows a worm gear and a helical gear in an engaged state.

Referring to FIG. 6 which shows the worm gear 105 in a state of engaging the helical gear 106a, the engaging state of the worm gear 105 with the helical gear 106a remains unchanged even when the position of the motor 102 changes to the right and left. Whereas, in the case of engagement of spur gears 701 and 702 as shown in FIG. 7, the state of power transmission degrades when the position of the motor 102 changes to the right and left as the rate of engagement between the gears is lowered by such changes. Next, referring to FIG. 8, which shows the amount of engagement of the worm gear 105 with the helical gear 106a, these gears engage each other over a wide range. It is apparent from FIG. 7 that the amount of engagement of the spur gears 701 and 702 is less than the engagement shown in FIG. 8. The larger amount of engagement ensured by the use of the worm gear and the helical gear stabilizes power transmission, because a larger engaging amount can be retained than the use of spur gears even when the engaging amount is lessened by changes in distance between axes. Further, the worm gear and the helical gear engage each other in a smooth manner as well as in the large amount. The smooth engagement ensures a less amount of variations of load imposed on the motor shaft and thus allows the motor shaft to be urged always in one direction. Therefore, the play which exists between the motor shaft and its bearing is always shifted to one side to reduce vibrations and noises resulting from irregular movement of the motor shaft.

Figure 5:
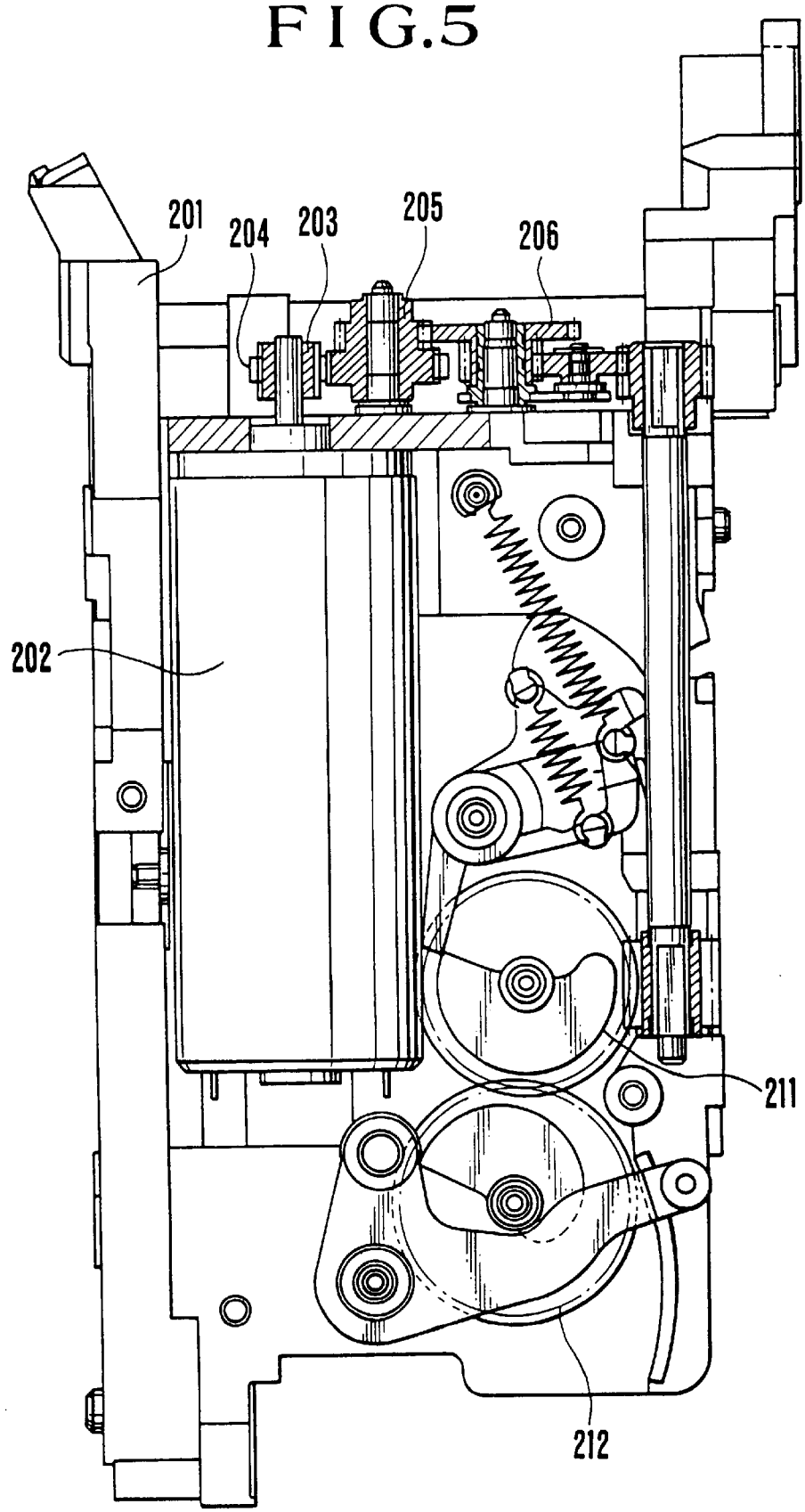
FIG. 5 is a sectional view showing a second embodiment of the invention.

A second embodiment of this invention is described below with reference to FIG. 5:

The output of a motor 202 is arranged to be transmitted from a pulley 203, which is attached to the output shaft of the motor 202, through a timing belt 204 to a pulley 205. After that, the motor output is transmitted to cam gears 211 and 212 via a gear train for moving the mirror up and down and charging the shutter in the same manner as in the case of the conventional device.

Compared with transmission by spur gears, the timing belt 204 has a greater amount of engagement, which lessens the fluctuations of load on the motor shaft in transmitting the motor power and ensures that the motor shaft is urged always in one direction. Therefore, the same advantageous effect is attainable as in the case of using the worm gear and the helical gear, so that the noise and vibrations caused by the motor can be lessened. Further, a certain amount of slackness which is necessary on the trailing side (slackening side) in using the timing belt 204 serves to absorb variations taking place in distance between the axes of the motor shaft and the pulley 205, so that the motor power can be stably transmitted.

In the cases of the first and second embodiments described above, the motor is mounted on the structural member of the camera through double-sided adhesive tapes or the like which have elasticity. The use of elastic tapes makes the vibrations of the motor less transmissive, so that the operating noise and vibration of the camera can be reduced. The use of the worm gear and the helical gear or the use of the timing belt which is strongly effective against changes in distance between the axes of the motor shaft and the transmission and speed-reduction gears due to the floating support of the motor lessens the noise and vibration of the initial stage of the speed-reduction system where noises and vibrations are most apt to be generated in the power transmission system. In addition, the noise and sound of the motor itself also can be lowered.

Figure 9:
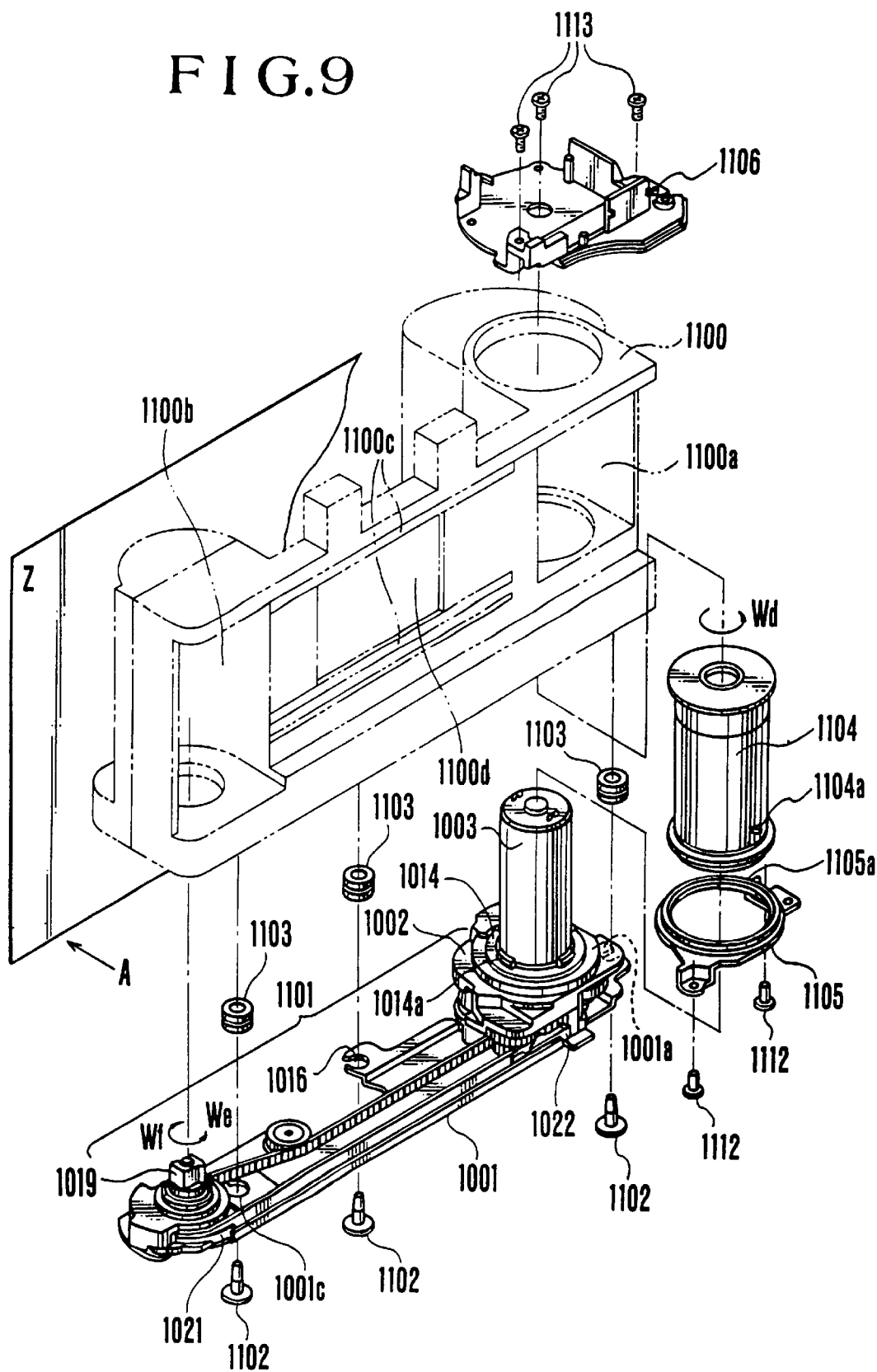
FIG. 9 is an exploded oblique view showing essential parts of a camera arranged as a third embodiment of the invention.
Figure 10:
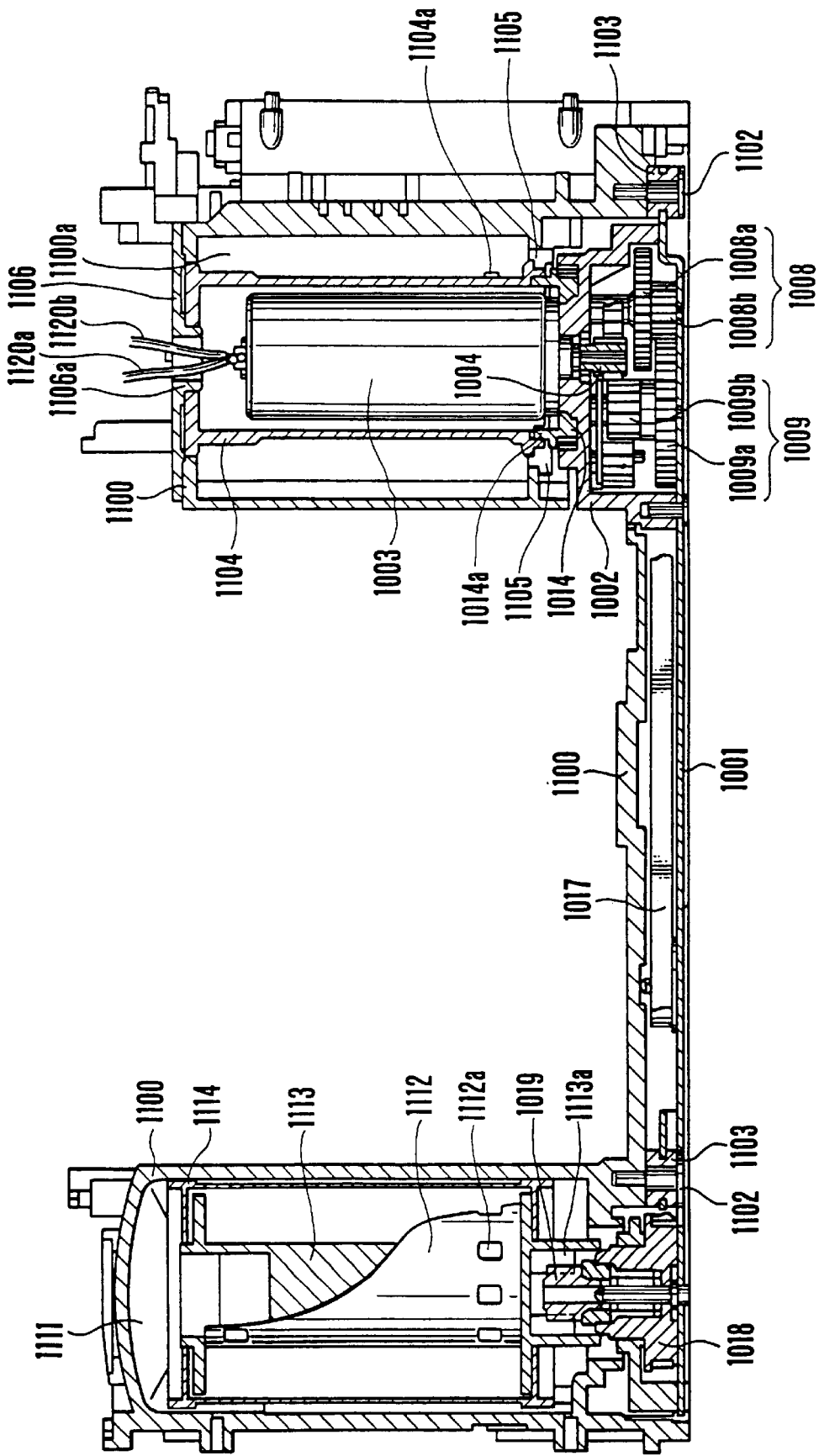
FIG. 10 is a sectional view showing the driving unit of the camera of FIG. 9 in an assembled state.
Figure 11:
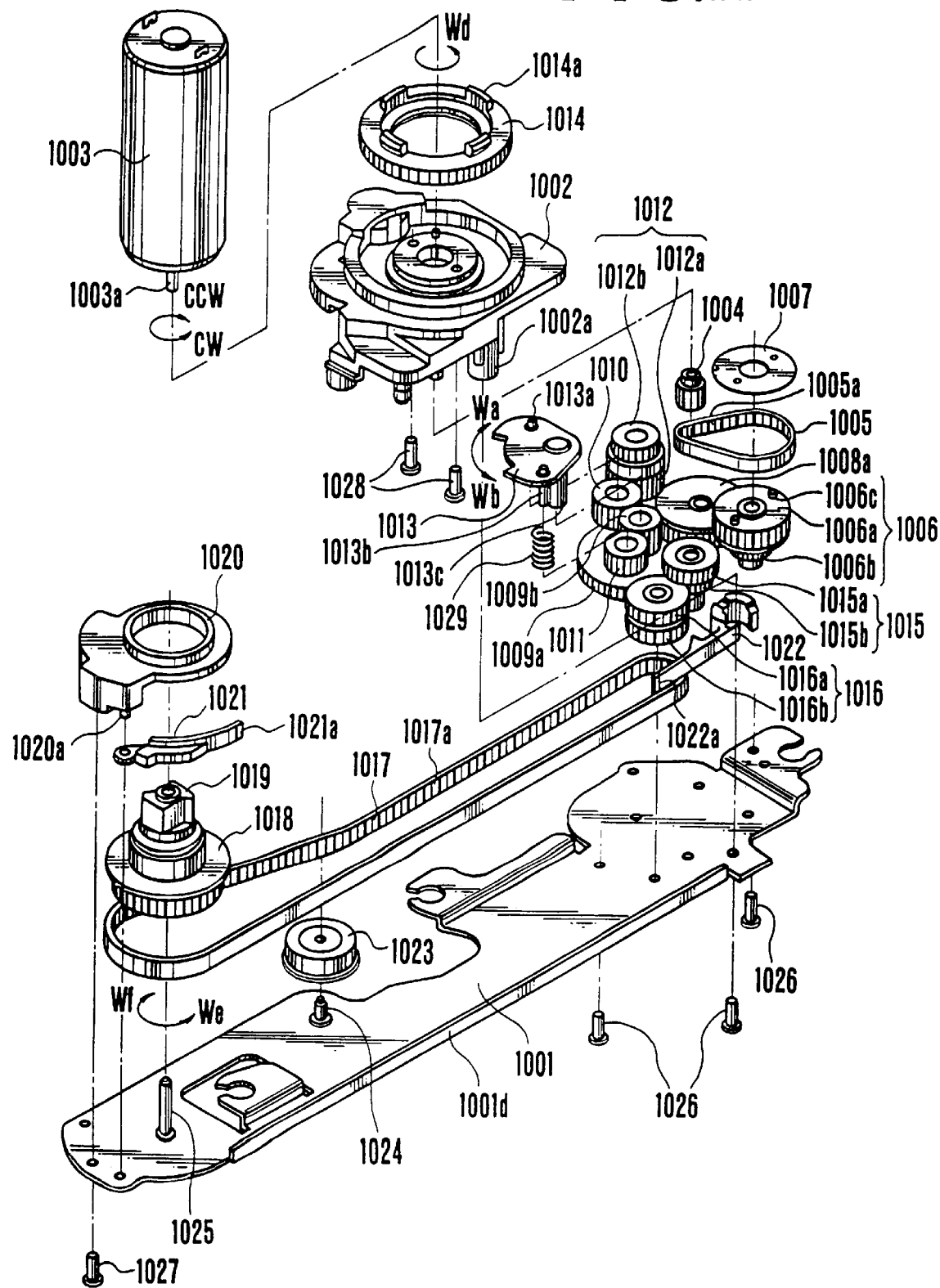
FIG. 11 is an oblique view showing the arrangement of the same driving unit.

FIG. 9 is an oblique view showing a third embodiment of the invention. A film feeding mechanism is formed including a driving unit 1101 and a take-up spool 1104. FIG. 10 is a sectional view taken from one side as indicated by an arrow A in FIG. 9 to show various parts of the third embodiment in a state of having been assembled on a camera body 1100. FIG. 11 is an oblique view showing the arrangement of the driving unit 1101 with a timing belt used for a speed-reduction device.

The driving unit 1101 of the third embodiment is first described with reference to FIGS. 10 and 11. A pulley 1004, which is provided with external teeth for engaging a timing belt 1005, is connected to the output 1003*a* of a motor 1003. The motor 1003 is fixed to a gear base plate 1002 with screws 1028 in a state of being surrounded with a gear 1014, which is arranged to be rotatable on the same axis as the output shaft 1003*a* of the motor 1003.

A pulley 1006*a*, which is provided with external teeth for engaging the timing belt 1005, is formed in one unified body with a gear 1006*b*, which is formed in an ordinary toothed shape. A double gear 1006 is formed by the pulley 1006*a* and the gear 1006*b*. The timing belt 1005 is made of a soft material and is provided with inner teeth 1005*a* for engaging the external teeth of the pulley 1004 and those of the pulley 1006*a*. A flange 1007, which is arranged as a restriction member to prevent the timing belt 1005 from coming off the pulleys 1006*a* and 1004, is attached to the pulley 1006*a*.

A gear 1008*a* is formed in one unified body with a gear 1008*b*, which has a different number of teeth from the gear 1008*a*. A double gear 1008 is formed by these gears 1008*a* and 1008*b*. A double gear 1009 is likewise formed jointly by gears 1009*a* and 1009*b*. A double gear 1012 is formed by gears 1012*a* and 1012*b*. A double gear 1015 is formed by gears 1015*a* and 1015*b*. A double gear 1016 is formed by a gear 1016*a* and a pulley 1016*b*. The pulley 1016*b*, which is formed in one unified body with the gear 1016*a*, is provided with external teeth, which are arranged to be capable of engaging a timing belt 1017 in the same manner as those of the pulley 1006*a*.

The double gear 1009 is rotatably fitted on a bearing 1013*c*, which is connected to planetary arm 1013. Planet gears 1010 and 1011 are respectively rotatably fitted on shafts 1013*a* and 1013*b*, which are connected to the planetary arm 1013. These planet gears 1010 and 1011 engage the gear 1009*b*. A coiled spring 1029 is arranged between the planetary arm 1013 and either the planet gear 1010 or 1011 to apply a frictional force. The double gear 1009 and the planet gears 1010 and 1011, which are connected to the planetary arm 1013 thus form a discrete unit having a planetary mechanism for power distribution.

The gears and the planetary unit described above are respectively fitted on shafts provided on a gear base plate 1002 in a serially engaging state to form a speed-reduction gear system for the motor 1003 and are thus supported by bearings between the gear base plate 1002 and the base plate 1001.

A film rewinding fork 1019 is arranged to be rotatable together with a pulley 1018, which is provided with external teeth for engaging the above-stated timing belt 1017. The pulley 1018 is rotatably fitted on a shaft 1025, which is connected to the base plate 1001. The movement in the direction of thrust of the pulley 1018 is restricted by a cover plate 1020, which is mounted on the base plate 1001 with a screw 1027. Between the pulley 1018 and the pulley 1016*b* mentioned in the foregoing is provided the timing belt 1017, which has inner teeth 1017*a* arranged along the whole length thereof to be capable of engaging these pulleys, with an idler 1023 arranged between these pulleys.

Levers 1021 and 1022 are provided for preventing the tooth slippage of the timing belt 1017. These levers are arranged along the outer circumference of the timing belt 1017 at parts where the pulleys 1016*b* and 1018 are engaging the timing belt 1017. The position of the lever 1022 is defined by a post 1002*a* on the gear base plate 1002 in a freely turntable state, and the position of the lever 1021 is defined by the cover plate 1020 and its projection 1020*a* also in a freely turnable state. The turning directions of the levers 1021 and 1022 are restricted respectively by a bent-up part 1001*d* of the base plate 1001 when the fore ends 1021*a* and 1022*a* of these levers abut on the bent-up part 1001*d*.

The operation of the driving unit 1101, which is arranged as described above, is independently confirmable because the driving unit 1101 is equipped completely with a small motor which is a drive source and the speed-reduction and transmission mechanisms for the motor power. Further, the operating noise of the driving unit can be easily lessened by separating the driving system thereof from the camera body by means of a suitable vibration absorber.

Referring now to FIGS. 9 and 10, the arrangement of the acting parts of a film feeding system is described as follows: An upper base plate 1106 is secured by screws 1113 to the upper part of a spool chamber 1100*a*, which is a void space provided in the camera body 1100 for film winding. A spool keep plate 1105 is secured by screws 1112 to the lower part of the spool chamber 1100*a*. A film winding spool 1104 is rotatably arranged within the spool chamber 1100*a* by an axial fitting engagement of the spool 1104 with a boss 1106*a* of the upper base plate 1106 and the cylindrical inner wall 1105*a* of the spool keep plate 1105. Further, since the spool 1104 has its movement in the direction of thrust restricted jointly by the upper base plate 1106 and the spool keep plate 1105, the spool 1104 can be handled as a unit in a state of being incorporated into the camera body 1100.

The base plate 1001, which is included in the above-stated driving unit 1101, is provided with cutout holes 1001*a*, 1001*b* and 1001*c*. Vibration absorbing bushing 1103, which are made of a soft material such as butyl rubber or the like are inserted into these holes in a vertically symmetric shape across the base plate 1001. The driving unit 1101 is mounted on the camera body 1100 by stepped screws 1102 via the bushes 1103. The driving unit 1101 is thus mounted on the camera body 1100 without directly touching the camera body 1100.

A gear 1014, which is exposed in the upper part of the driving unit 1101, has a plurality of arcuate claws 1014*a* formed in one body with the gear 1014. Each of the claws 1014a is inserted in a groove formed in the lower part of the spool 1104 with the gear 1014 arranged on the same axis as the spool 1104. The fork 1019, which is mounted on the base plate 1001, protrudes into a cartridge chamber 1100b formed in the camera body 1100.

The operation of the film feeding mechanism, which is arranged as mentioned above, is described with reference to FIGS. 9 to 11 as follows: The driving unit 1101 is operated by controlling the rotation of the motor 1003. A control circuit having an arithmetic unit, which is not shown, is arranged to allow power supply to the motor 1003 through lead wires 1120a and 1120b and to change the rotating direction of the output shaft 1003a of the motor 1003 by changing the polarity of the power.

The driving force of the motor 1003 is supplied from the pulley 1004, which is connected to the output shaft 1003a of the motor 1003, to the double gear 1006 via the timing belt 1005. The driving force is transmitted further to the double gears 1008 and 1009 one after another to be moderated according to their gear ratios.

In a case where the output shaft 1003a of the motor 1003 rotates counterclockwise (CCW), the frictional action of the above-stated planet gear causes the planetary arm 1013 to swing in the direction of arrow Wa according to the rotation of the double gear 1009. The planet gear 1010, which is connected to the planetary arm 1013, then comes to engage the double gear 1012 to transmit the driving force. Further, the output of the double gear 1012 is transmitted to the gear 1014 to cause the spool 1104, through the claws 1104a, to rotate in the direction of arrow Wd with the rotative driving force which has been adequately moderated.

The spool 1104 is provided with the claws 1104a. The spool 1104 rotates in the direction of arrow Wd while having a perforation hole 1112a in the leader part of the film 1112 hooked by the claw 1104a. The film 1112 is thus taken up and wound around the spool 1104. The film 1112 pulled out from the inside of a cartridge 1114 is transported on the rail surface 1100c provided in the camera body 1100 and comes to a stop in a position, which is apposite to the frame 1100d of a photographing picture plane.

A cartridge shaft 1113 on which the film 1112 is wound around constantly engages the fork 1019. During the above-stated process of the winding action on the film 1112, the fork 1019 is rotated in the direction of arrow We. The pulley 1018, which is connected to the fork 1019, the timing belt 1017 and the double gears 1015 and 1016 are also caused to rotate.

When the output shaft 1003a of the motor 1003 rotates clockwise (CW), the planetary arm 1013 is caused to swing in the direction of arrow Wb. The driving force is transmitted to the double gear 1015. The driving force of the double gear 1015 is transmitted to the double gear 1016 and is further to the pulley 1018 through the timing belt 1017. As a result, the fork 1019 is caused to rotate in the direction of arrow Wf by the rotative driving force which is adequately moderated. The cartridge shaft 1113, which is connected to the fork 1019, is then caused to rotate also in the direction of arrow Wf to rewind the film 1112 back into the cartridge 1114.

Figure 12:
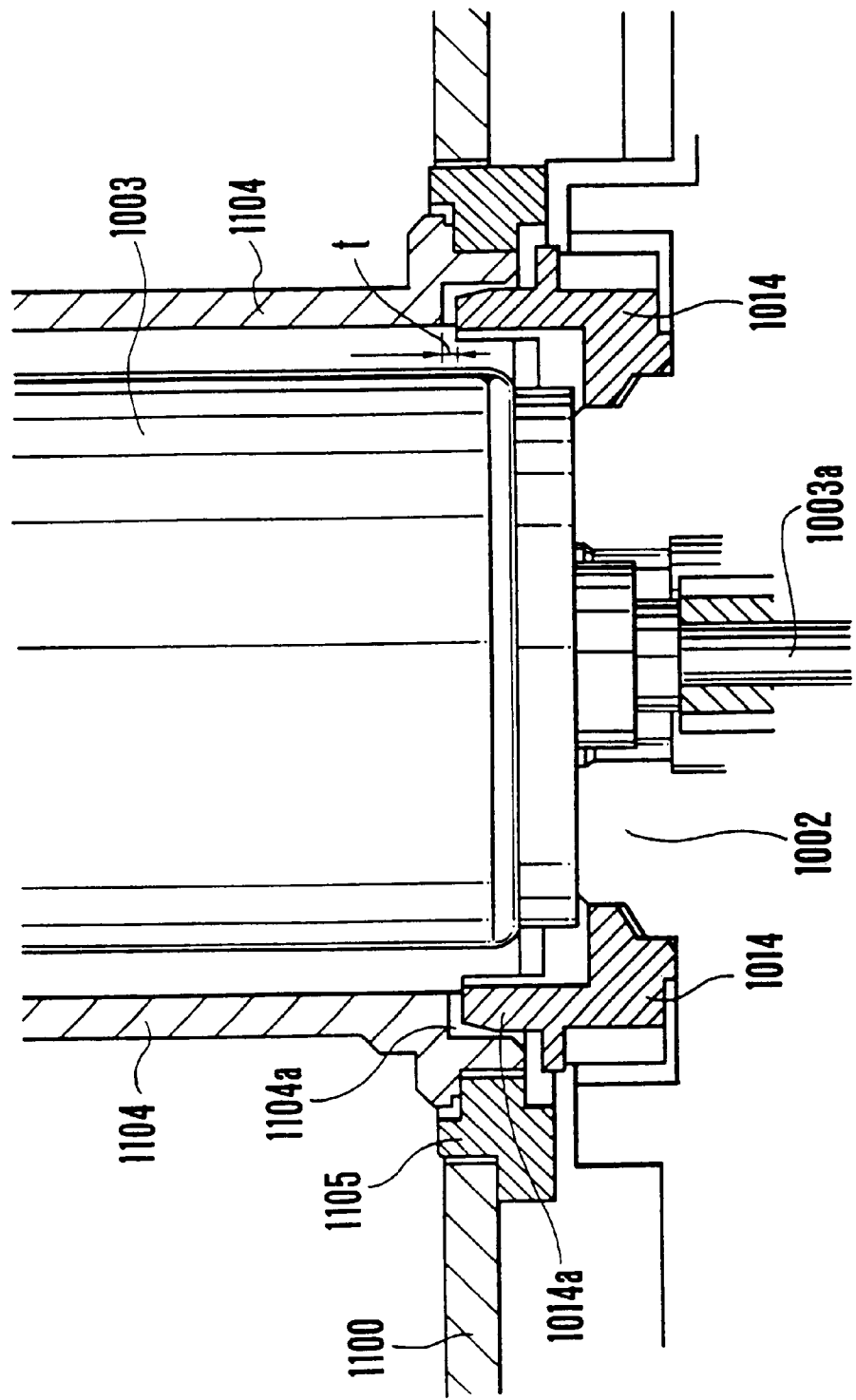
FIG. 12 is an enlarged view showing a part of the camera of FIG. 9.
Figure 13A:
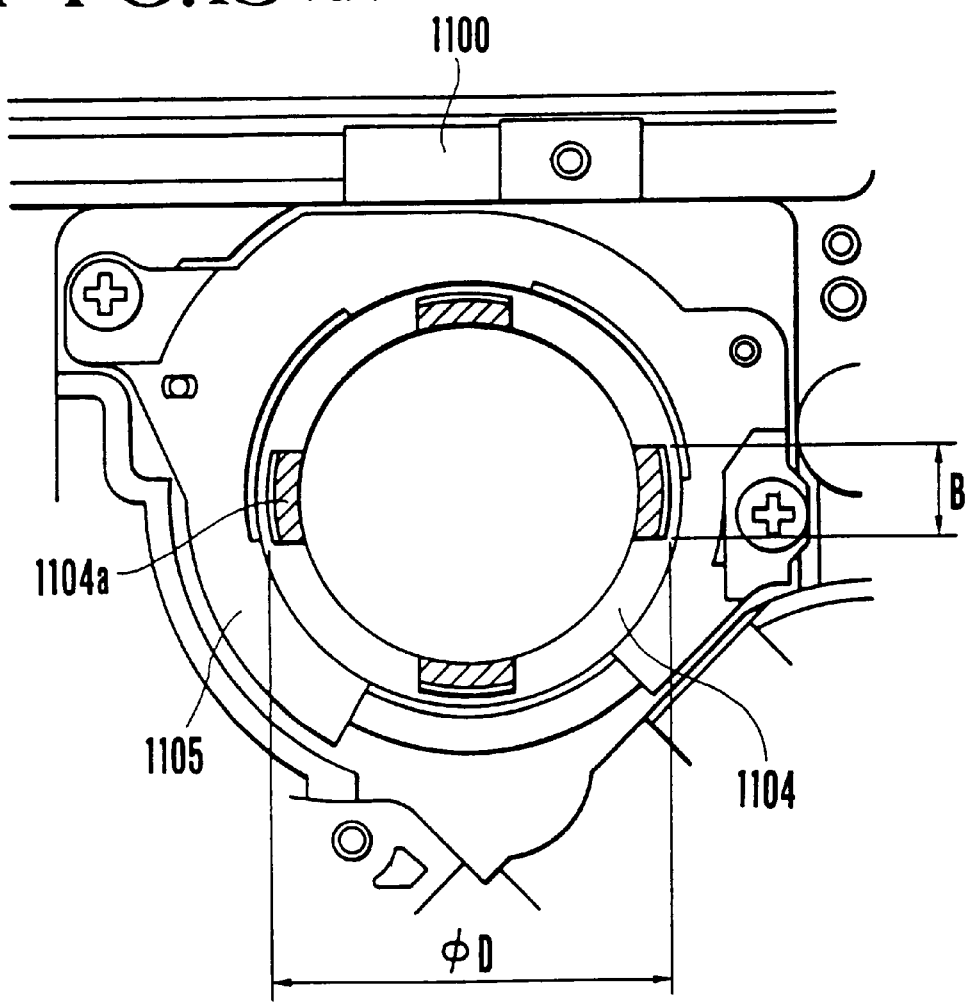
FIGS. 13(a) and 13(b) are plan view showing connecting parts between a spool and a driving part.
Figure 13B:
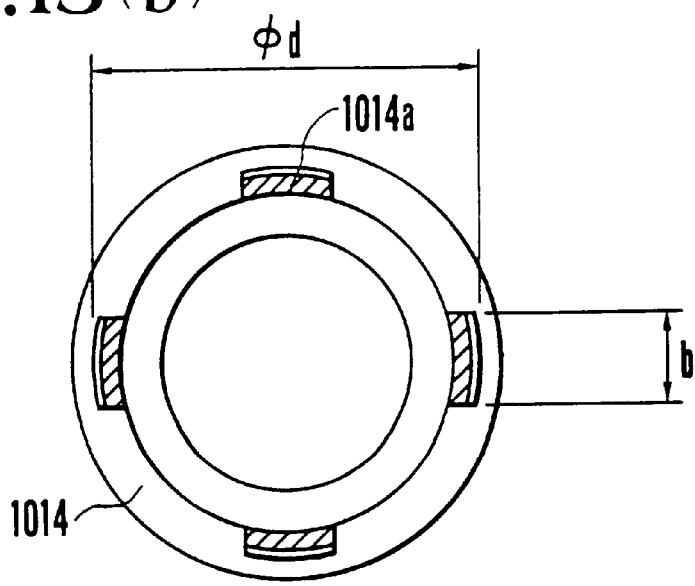

FIG. 12 is an enlarged view showing a part of FIG. 10, which is a connection part between the gear 1014 and the spool 1104. FIGS. 13(a) and 13(b) respectively show the spool 1104 as viewed from below and the gear 1014 as viewed from above.

The diametral dimension φd (FIG. 13(b)) of the claws 1014a provided on the gear 1014 and the diametral dimension φD (FIG. 13 (a)) of the grooves 1104a provided in the spool 1104 for engagement with the claws 1014a are arranged to leave some clearance unlike the dimensions ordinarily arranged for fitting engagement. A relation between widths b and B is also likewise arranged to leave some clearance. The dimensions in the direction of height are also arranged to leave some clearance as much as a value t, as shown in FIG. 12. This dimensional arrangement is made for the purpose of preventing an increase of operating resistance due to competitive contact of the gear 1014 with the spool 1104, because the arrangement to define the position of the driving unit solely by means of bushes 1103 cannot give a sufficient positioning accuracy and also because the driving unit 1101 is moved and vibrated by a load imposed thereon during the process of film winding and rewinding.

Figure 14:
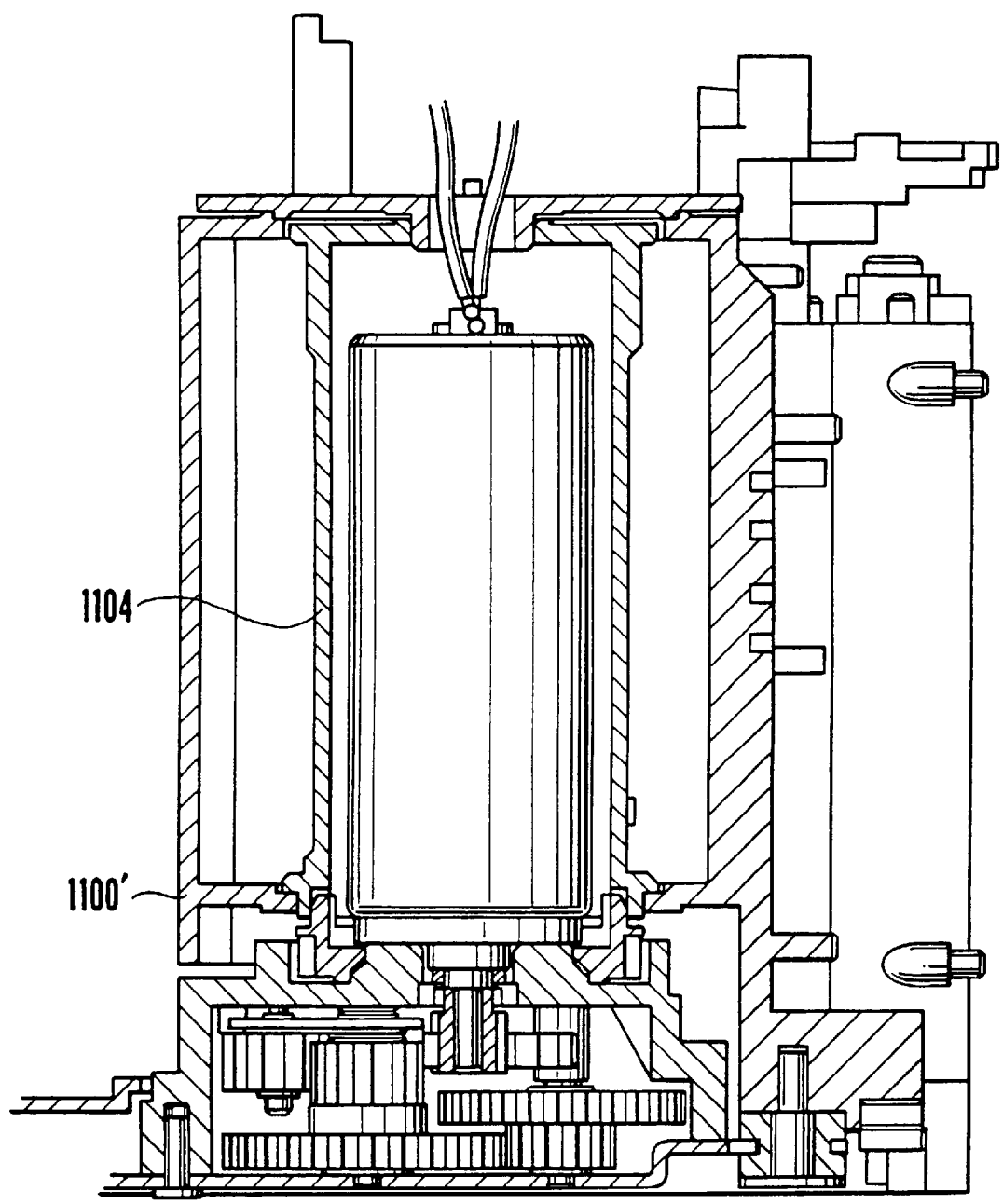
FIG. 14 is a sectional view showing a fourth embodiment of the invention.
Figure 15:
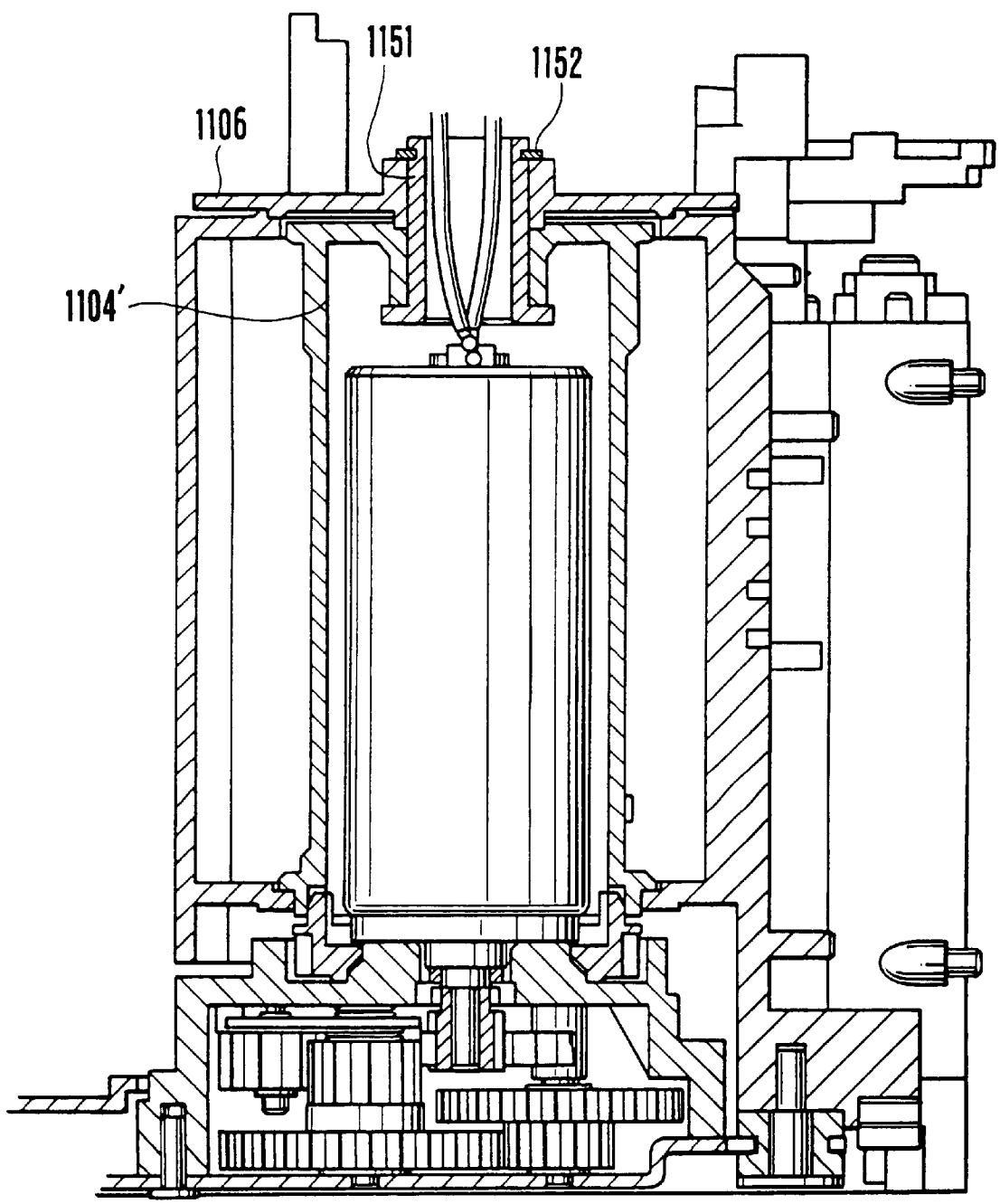
FIG. 15 is a sectional view showing a fifth embodiment of the invention.
Figure 16:
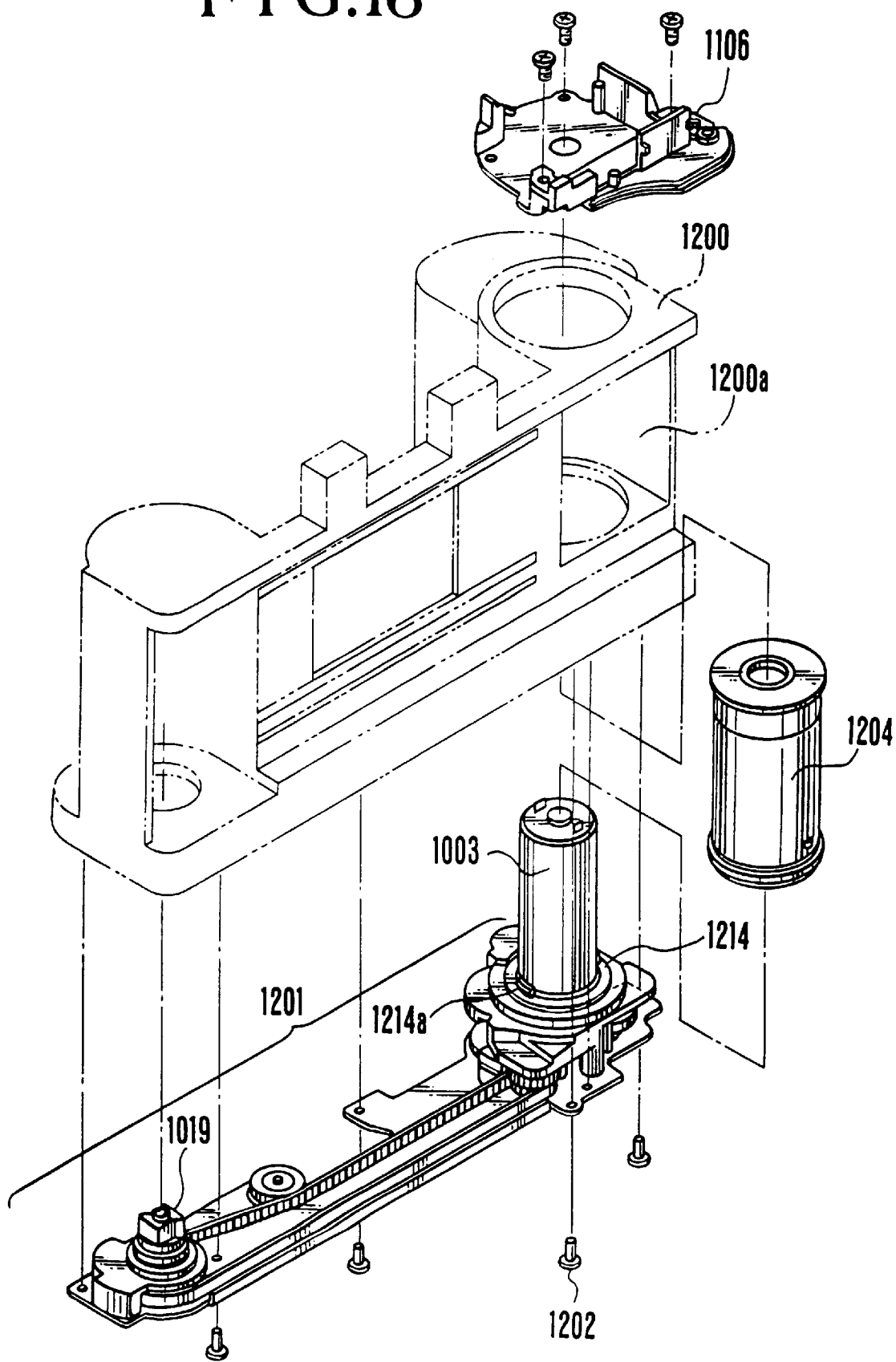
FIG. 16 is an oblique view showing one example of the art serving as the premise of the invention.
Figure 17:
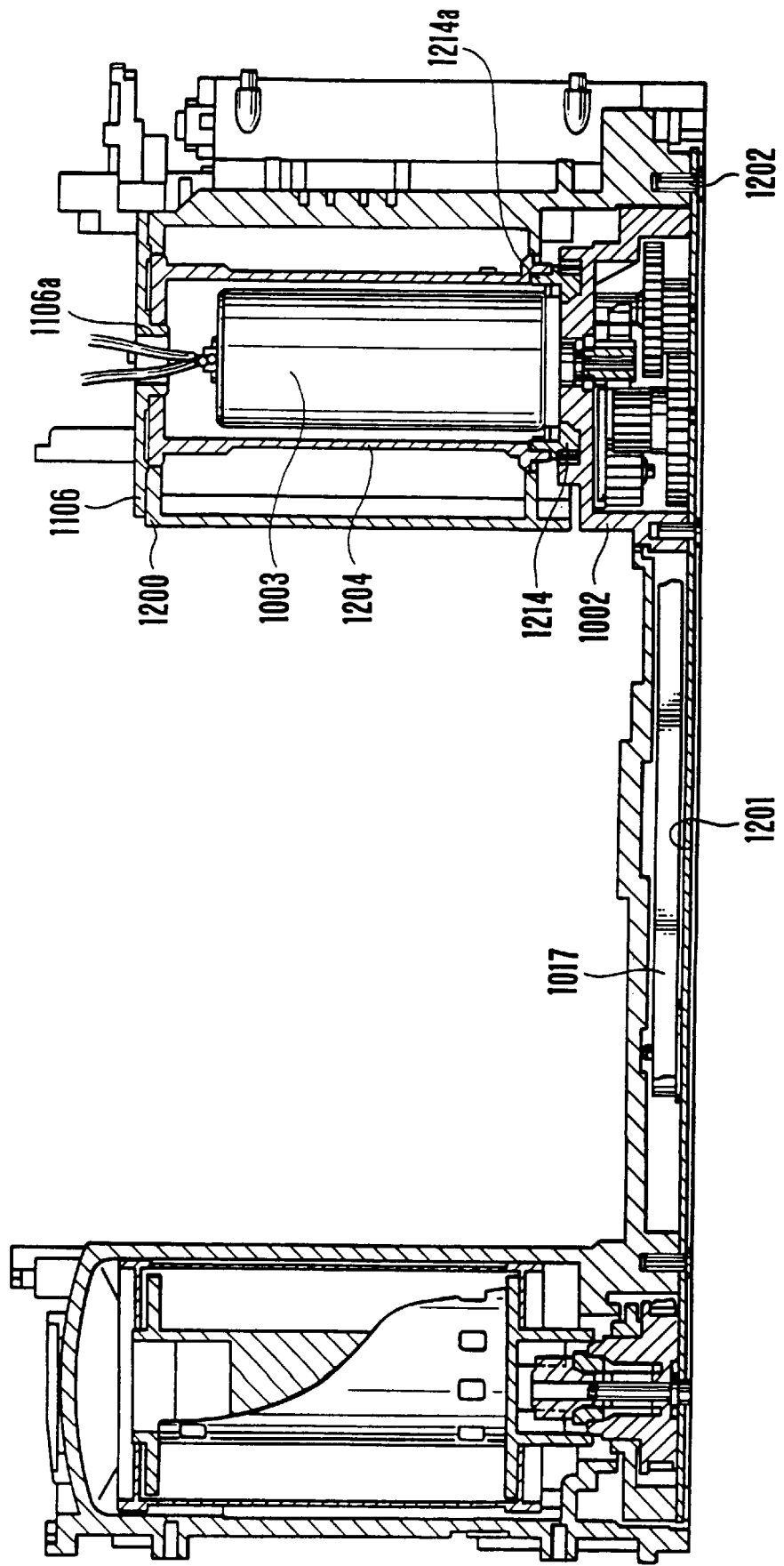
FIG. 17 is a sectional view showing the arrangement of FIG. 16 in an assembled state.

FIGS. 14 and 15, respectively, show fourth and fifth embodiments of this invention. FIG. 14 shows a case where the spool 1104 is fitted directly on the camera body 1100' instead of using the spool keep plate 1105. In the case of FIG. 15, the spool 1104' is fixed in place by means of a bearing 1151 in an open-sided manner.

In accordance with the arrangement of the third, fourth, or fifth embodiment, the driving part is separated from the camera body by means of a vibration absorber without impairing the movement of a film take-up spool, which comes into contact directly with the film, so that a film feeding noise can be effectively lessened.

Figure 18:
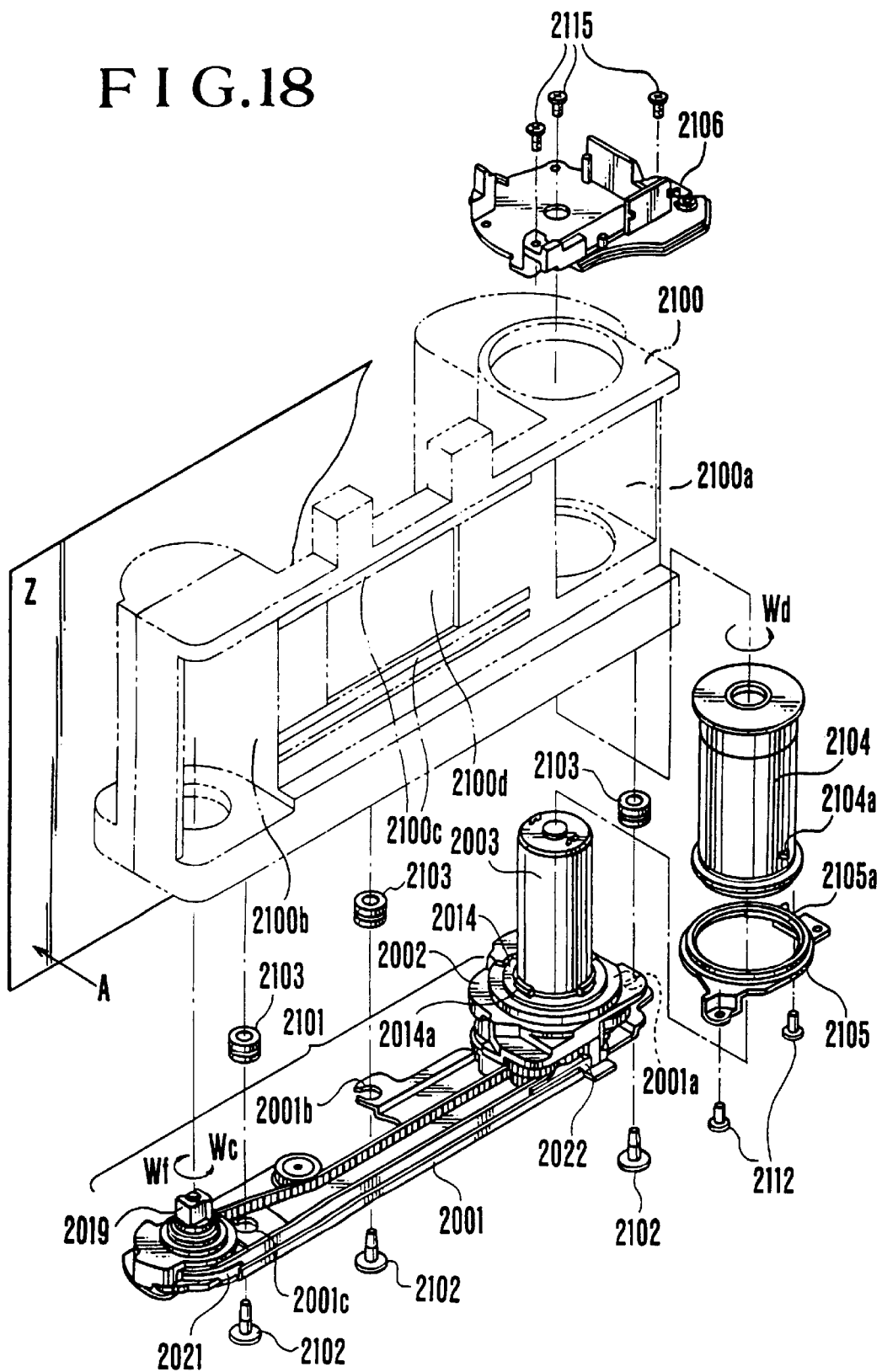
FIG. 18 is an oblique view showing a sixth embodiment of the invention.
Figure 19:
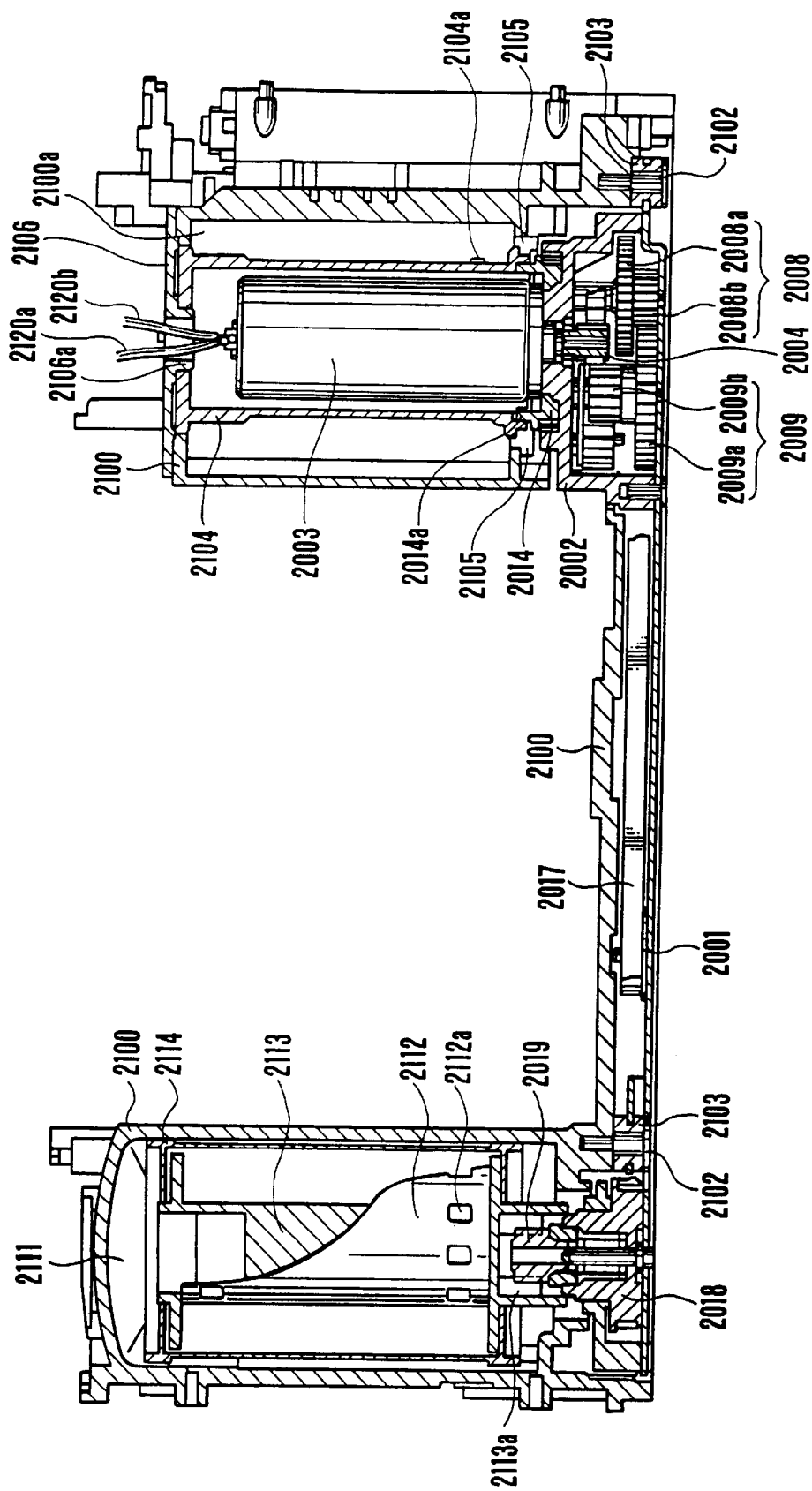
FIG. 19 is a sectional view showing the parts of a driving mechanism of the camera of FIG. 18 in an assembled state.
Figure 20:
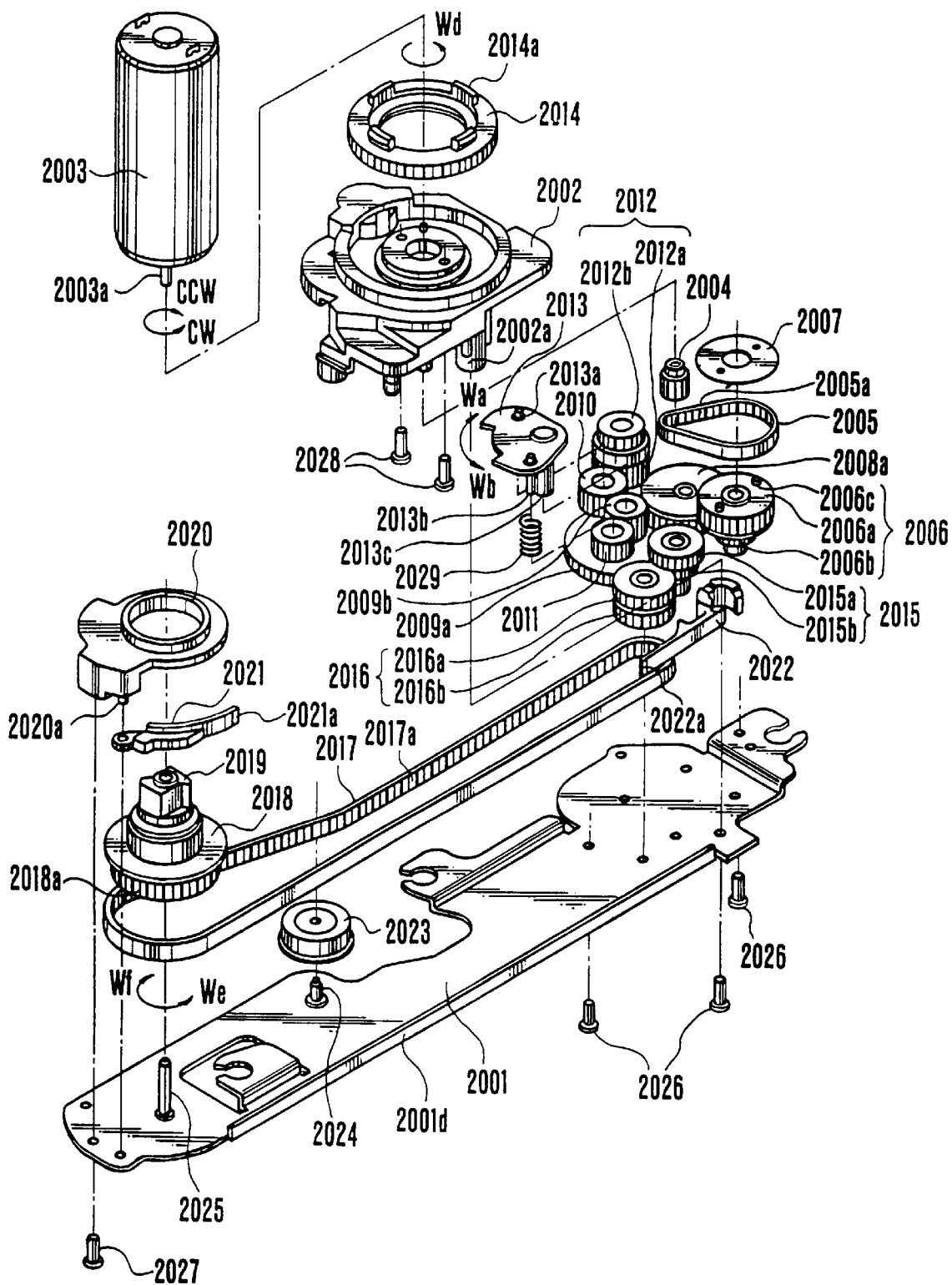
FIG. 20 is an oblique view showing the details of a driving unit shown in FIG. 18.

FIG. 18 shows in an oblique view the arrangement of a film feeding mechanism including a driving unit 2101 in a camera to which this invention is applied as a sixth embodiment thereof. FIG. 19 is a sectional view showing various parts shown in FIG. 18 in a state of being assembled on the camera body 2100. The sectional view of FIG. 19 is taken by viewing a section Z shown in FIG. 18 in the direction of arrow A. FIG. 20 is an oblique view showing the arrangement of the driving unit 2101 wherein a timing belt is used for a speed-reduction device.

The arrangement of the driving unit 2101 is first described with reference to FIG. 20. The output shaft 2003a of a motor 2003 is connected to a pulley 2004, which has external teeth arranged to engage a timing belt 2005. The motor 2003 is secured to a gear base plate 2002 with screws 2028 in a state of being surrounded with a gear 2014, which is arranged to be rotatable on the same axis as the output shaft 2003a of the motor 2003.

A pulley 2006a, which has external teeth arranged to engage the timing belt 2005, and a gear 2006b, which has ordinary teeth are formed in one unified body to form a double gear 2006. The timing belt 2005, which is made of a soft material and has inner teeth 2005a arranged to be capable of engaging the external teeth of the pulleys 2004 and the 2006a, is put around these pulleys. A flange 2007 is secured to the pulley 2006a and serves as a restricting member to prevent the timing belt 2005 from coming off the pulleys 2006a and 2004.

Gears 2008a and 2008b which have different numbers of teeth are arranged in one unified body to form a double gear 2008. Gears 2009a and 2009b are likewise arranged to form a double gear 2009. Gears 2012a and 2012b are arranged to form a double gear 2012. Gears 2015a and 2015b are arranged to form a double gear 2015. Like the pulley 2006a, a pulley 2016b is also provided with external teeth which are arranged to engage the timing belt 2017. A gear 2016a is formed in one unified body with the pulley 2016b to form a double gear 2016.

The double gear 2009 is rotatably fitted on a bearing 2013c, which is connected to a planetary arm 2013. Shafts 2013a and 2013b are connected to the planetary arm 2013. Planet gears 2010 and 2011 are rotatably fitted on the shafts 2013a and 2013b and engage the gear 2009b. A coiled spring 2029 is arranged to introduce friction between either of the planet gears 2010 and 2011 and the planetary arm 2013. With the double gear 2009 and the planet gears 2010 and 2011 connected to the planetary arm 2013 in this manner, they form a discrete unit of planetary gear mechanism for motor power distribution.

The above-stated gears and the planetary unit are respectively fitted on shafts provided on a gear base plate 2002 and are bearing-supported between a base plate 2001 and the gear base plate 2002 in a state of being serially engaged each other to form a speed-reduction gear system for the motor 2003. A film rewinding fork 2019 engages a pulley 2018 and is rotatable with the latter. The pulley 2018 is provided with external teeth for engaging the timing belt 2017 and is rotatably fitted on a shaft 2025, which is connected to the base plate 2001. The movement in the direction of thrust of the pulley 2018 is restricted by a cover plate 2020 which is mounted on the base plate 2001. The timing belt 2017, which is provided with inner teeth arranged over the whole circumference of it for engaging the pulleys 2018 and 2016b, is wrapped around these pulleys 2018 and 2016b.

Levers 2021 and 2022 are members arranged along the periphery of the timing belt 2017 to prevent the tooth slippage of the timing belt 2017 at parts where the timing belt 2017 engages the pulleys 2016b and 2018. The lever 2022 is turnably positioned by a post 2002a on the gear base plate 2002. The lever 2021 is positioned likewise by the cover plate 2020 and its projection 2020a. The turning directions of these levers 2021 and 2022 are restricted with their fore ends 2021a and 2022a arranged to abut on a bent-up part 2001d of the base plate 2001.

With the driving unit 2101 arranged as described above, the driving unit 2101 has all the necessary parts for a film feeding system including a small motor, and speed-reduction and transmission mechanisms for the motor power. Therefore, the operation of the driving unit 2101 is independently confirmable. Further, the operating noise of the driving system can be easily lessened by arranging the driving system in a state of being separated from the camera body by means of a vibration absorber or the like.

Referring again to FIGS. 18 and 19, the acting parts of a film feeding system of the sixth embodiment of this invention is arranged as follows: An upper base plate 2106 is secured by screws 2115 to the upper part of a spool chamber 2100a, which is a void space provided in the camera body 2100 for film winding. A spool keep plate 2105 is secured by screws 2112 to the lower part of the spool chamber 2100a. A film winding (or take-up) spool 2104 is rotatably set within the spool chamber 2100a by axially fitting and engaging it with a boss 2106a of the upper base plate 2106 and the cylindrical inner wall 2105a of the spool keep plate 2105. The movement in the direction of thrust of the spool 2104 is thus restricted by the upper base plate 2106 and the spool keep plate 2105. The spool 2104 thus can be handled as a unit in a state of being incorporated in the camera body 2100.

The base plate 2001, which is included in the driving unit 2101 described in the foregoing, is provided with cutout holes 2001a, 2001b and 2001c. Vibration absorbing bushes 2103, which are made of a soft material such as butyl rubber, are respectively fitted into these holes 2001a, 2001b and 2001c in a vertically symmetric shape across the base plate 2001. The driving unit 2101 is mounted on the camera body 2100 by means of stepped screws 2102 through these bushes 2103. The driving unit 2101 is thus mounted without directly touching the body 2100.

A gear 2014, which is exposed on the upper part of the driving unit 2101, is provided with a plurality of arcuate claws 2014a. These claws 2014a are formed in one body with the gear 2014 and are arranged on the same axis as the spool 2104 in a state of being inserted into grooves formed in the lower part of the spool 2104. The fork 2019, which is mounted on the base plate 2001, is arranged to protrude into a film cartridge chamber 2100b which is formed in the camera body 2100.

Referring to FIGS. 18, 19 and 20, the film feeding mechanism, which is arranged as described above, operates in the following manner: The driving unit 2101 is operated by controlling the rotation of the motor 2003. A control circuit (not shown), which has an arithmetic unit, appropriately performs a sequence of processes for controlling the motor 2003 by supplying power to the motor 2003 through lead wires 2120a and 2120b and by changing the polarity of the power supply to change the rotating direction of the output shaft 2003a of the motor 2003.

The pulley 2004, which is connected to the output shaft 2003a of the motor 2003, transmits the driving force of the motor 2003 to the double gear 2006 via the timing belt 2005. The driving force is transmitted further to the double gears 2008 and 2009 one after the other to be moderated according to the numbers of their teeth.

When the rotating direction of the output shaft 2003a is counterclockwise (CCW), the planetary arm 2013 is swung by the frictional action of the planet gear in the direction of arrow Wa according to the rotation of the double gear 2009. In this case, therefore, the planet gear 2010, which is in connection with the planetary arm 2013, engages the double gear 2012 to transmit the driving force. Further, the output o f the double gear 2012 is transmitted to the gear 2014. Then, the spool 2104 is rotated in the direction of arrow Wd through the claws 2014a by a suitably moderated rotative driving force.

The spool 2104 is provided with claws 2104a. A winding action is performed on the film 2112 by rotating the spool 2104 in the direction of arrow Wd while causing perforation holes 2112a provided in the leader part of the film 2112 to be hooked by the claws 2104a of the spool 2104. The film 2112 pulled out from the cartridge 2114 is moved over a rail surface 2100c arranged on the camera body 2100 and comes to a stop in a position which is apposite to a picture taking plane frame 2100d.

A cartridge shaft 2113 on which the film 2112 is wound around has a projection 2113a. The projection 2113a is constantly engaging the fork 2019. During the film winding action, the fork 2019 is rotated in the direction of arrow We. The pulley 2018, the timing belt 2017 and the double gears 2015 and 2016 which are connected to the fork 2019 are also rotated together.

If the rotating direction of the output shaft 2003a is clockwise (CW), the planetary arm 2013 is swung in the direction of arrow Wb. The driving force of the motor 2003 is transmitted to the double gear 2015. The driving force of the double gear 2015 is then transmitted to the double gear 2016 to be further transmitted to the pulley 2018 via the timing belt 2017. As a result, the fork 2019 is rotated in the direction of arrow Wf by the rotative driving force which is adequately moderated.

With the fork 2019 rotated in this manner, the cartridge shaft 2113, which is connected to the fork 2019, is also rotated in the direction of arrow Wf to cause the film 2112 to be rewound and stowed in the cartridge 2114.

Figure 21:
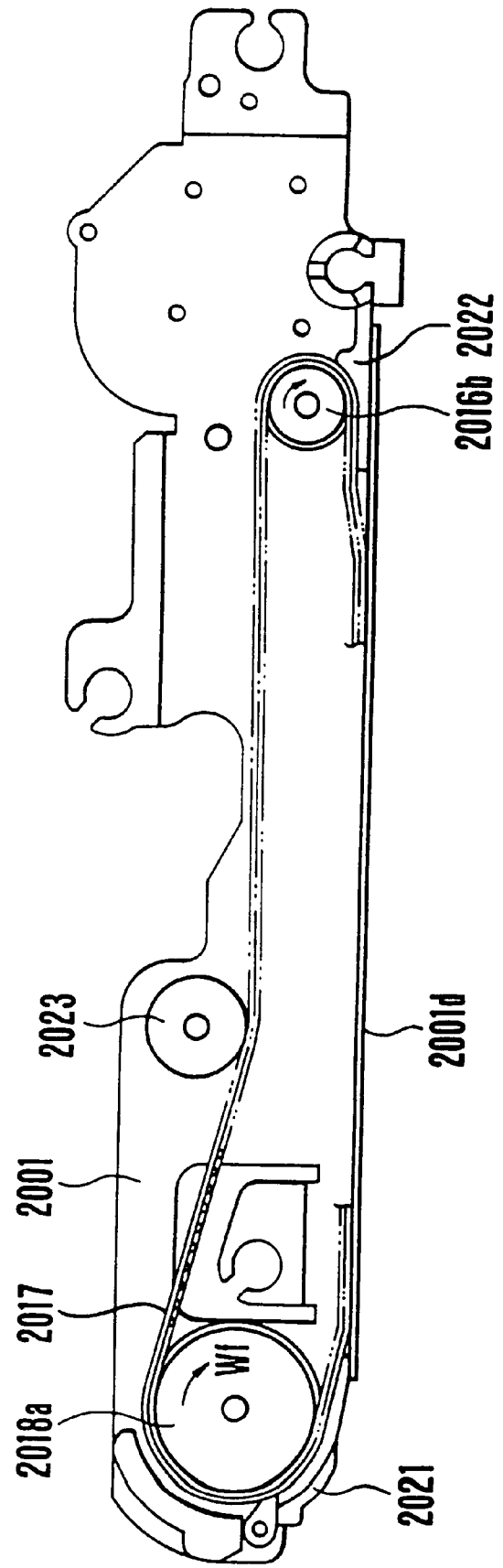
FIG. 21 shows a part of FIG. 20.

A mechanism for preventing the tooth slippage of the timing belt 2017 is arranged as follows: FIG. 21 shows in a plan view the layout of the timing belt 2017, the pulleys 2016b and 2018 and the levers 2021 and 2022, which are provided for preventing the tooth slippage. The timing belt 2017 is provided with an idler 2023 for the purpose of warding off other parts, which are not shown. The idler 2023 is not directly related to this invention.

The timing belt 2017 is put (wrapped) around the pulleys 2016b and 2018 in a state of being set at a low initial tension. When a driving force is applied to the pulley 2016b in the direction of arrow Wf, the timing belt 2017 slackens at its parts engaging the pulleys 2016b and 2018, as mentioned in the foregoing. However, since these parts are surrounded by the levers 2021 and 2022, in this instance, the timing belt 2017 is prevented from completely coming off the pulleys 2016b and 2018 and is allowed to slide along these levers 2021 and 2022.

Then, since the timing belt 2017 is disposed at the end of the speed-reduction gear mechanism, the timing belt 2017 moves slowly and, unlike ordinary belts, the belt 2017 is never expanded by a centrifugal force. Therefore, a sliding resistance arising between the timing belt 2017 and the levers 2021 and 2022 is negligible unless the surfaces of these levers are very roughly finished.

Figure 22:
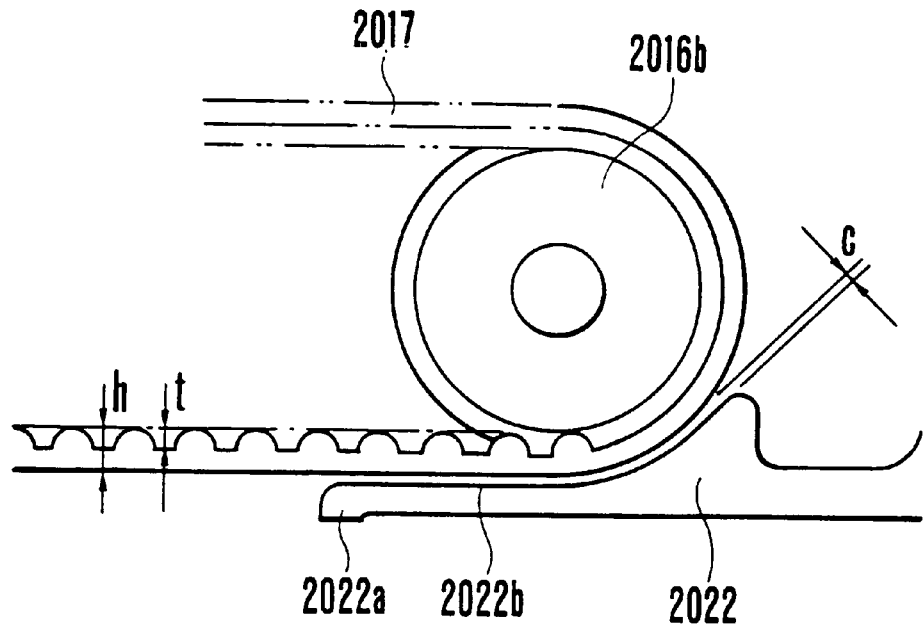
FIG. 22 is an enlarged view showing a part of FIG. 21.

FIG. 22 shows the details of the tooth slippage preventing lever 2022 provided on the side of the pulley 2016b. The wall surface 2022b of the lever 2022 is set apart as much as a clearance c from the design position of the timing belt 2017 wrapped around the pulley 2016b without any slackness. The clearance c is provided for the purpose of preventing the timing belt 2017 from malfunctioning between the pulley 2016b and the lever 2022, because of fluctuations in thickness h of the timing belt within the tolerance limits of manufacture. It goes without saying that, to prevent complete disengagement, the clearance c is set to be less than the height t of the teeth of the timing belt 2017.

Therefore, the clearance c is determined according to the tolerance of the thickness h and the tooth height t of the timing belt 2017. The tolerance range of the thickness h must be set at a value less than the teeth height t.

It has been ascertained through tests that the above-stated tooth slippage preventing mechanism obviates the necessity of imparting the initial tension to the timing belt 2017 because no tooth slippage occurs even when the timing belt 2017 is considerably slackened.

FIG. 23 shows a seventh embodiment of this invention. In the seventh embodiment, the tooth slippage preventing levers 2021 and 2022 are formed respectively in one body with a fork cover plate 2020 and in one body with a gear base plate 2002, for reduction in cost.

Figure 24:
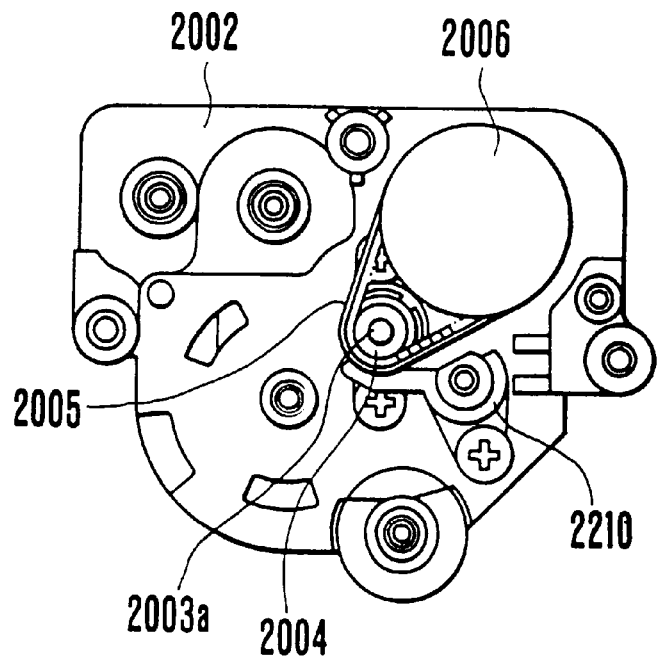
FIG. 24 is a plan view showing an eighth embodiment of the invention.
Figure 25:
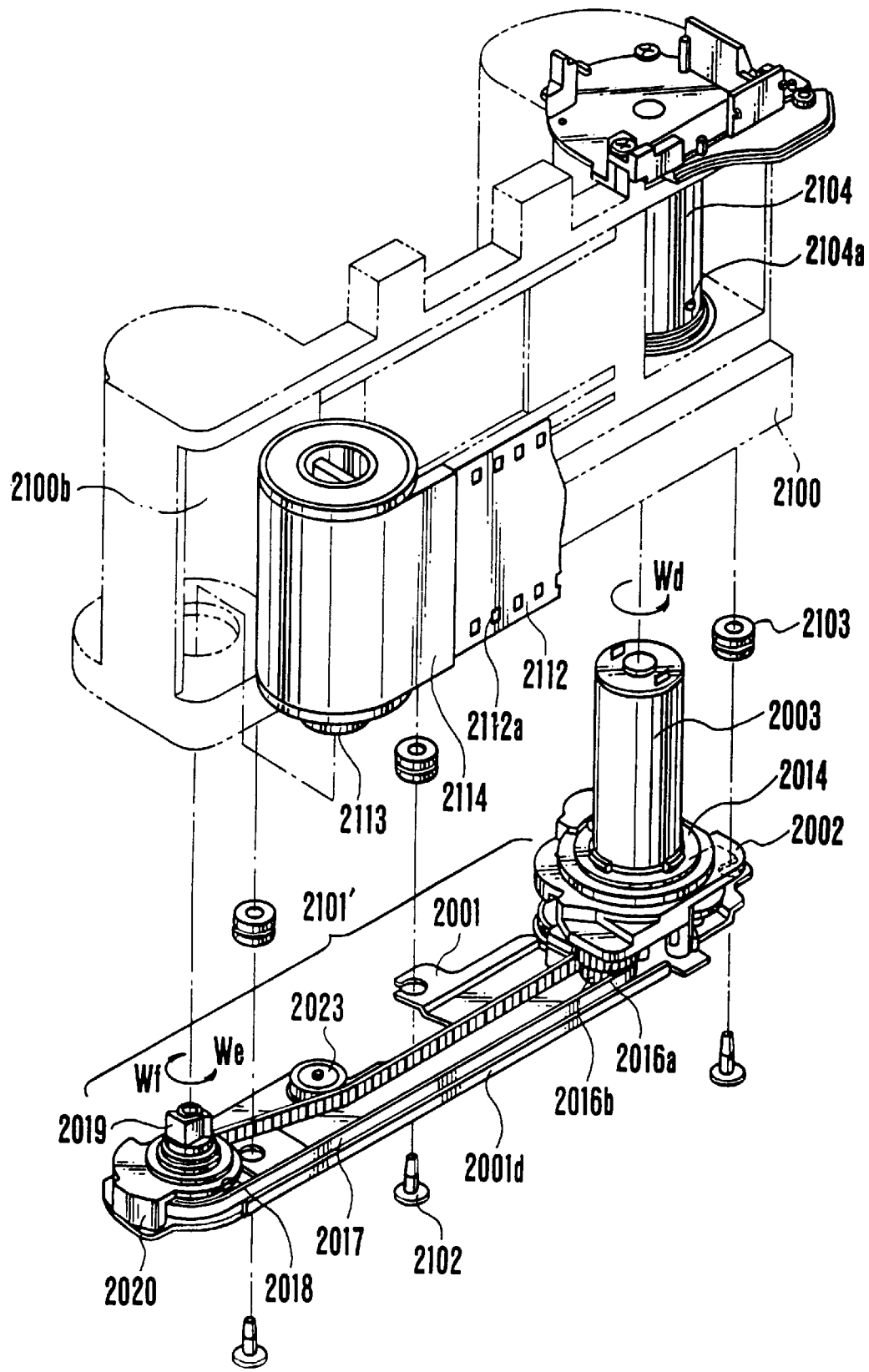
FIG. 25 is an oblique view showing an example of the art serving as the premise of the invention.

FIG. 24 shows an eighth embodiment of the invention. In this case, the invented arrangement is applied to the timing belt 2005 which is used for the motor output shaft in the sixth embodiment described in the foregoing.

The output of the small motor used for a camera is intrinsically small. Therefore, in a case where a timing belt 2005 is used directly for the output shaft 2003a of the motor 2003, as in the case of the eighth embodiment, it is necessary to slacken the timing belt 2005 for suppressing a loss of torque. When the motor locks, particularly, at the end of the film, the trouble of tooth slippage tends to occur if the starting torque of the motor is high, depending on the kind of the timing belt, although there is no problem if the starting torque of the motor is low.

FIG. 24 is a plan view taken from below showing a pulley 2004, which is mounted on a gear base plate 2002, a double gear 2006 and the timing belt 2005. A tooth slippage preventing member 2210, which is arranged similarly to that of the sixth embodiment, is secured to the gear base plate 2002.

As described above, the sixth, seventh and eighth embodiments have tooth slippage preventing members arranged as follows: The timing belt having at least arc-formed parts around the peripheries of pulleys is in a state of engaging the external teeth of the pulleys. Wall faces are arranged along the peripheral face of the timing belt with a clearance left between the timing belt and the wall faces. The tooth slippage preventing members are arranged in such a way as to have the clearance not exceeding the maximum engagement height of the teeth of the timing belt and that of the pulleys at some parts of the clearance. The arrangement reliably prevents the tooth slippage with a simple and low-cost mechanism. In addition to that advantage, the timing belt can be efficiently arranged in a limited space and used with a very little loss of torque. Therefore, the use of the timing belt in accordance with the invented arrangement further facilitates a reduction in number of parts and noises in a motor-driven type camera where the power supply and the driving force are limited.

What is claimed is:

1. A camera comprising:
   a) a motor;
   b) a camera operating mechanism arranged to be driven by a rotary output of said motor;
   c) a power transmission mechanism arranged to transmit the rotary output of said motor to said camera operating mechanism, said power transmission mechanism including a power transmitting belt which has a plurality of inner teeth formed on the inner side thereof and a pulley having external teeth engaging the inner teeth of said power transmitting belt, said pulley being arranged to rotate according to movement of said power transmitting belt; and
   d) a disengagement preventing member disposed at a position remote from said pulley and providing a clearance between a periphery of the belt at said pulley and said disengagement preventing member that is less than a height of the inner teeth of said power transmitting belt, whereby said disengagement preventing member prevents disengagement of said pulley from said power transmitting belt during normal operation of said power transmission mechanism.

2. A camera according to claim 1, wherein said disengagement preventing member has an approximately arcuate surface which is positioned along the periphery of said pulley.

3. A camera according to claim 1, wherein said camera operating mechanism is a film feeding mechanism.

4. A camera according to claim 3, wherein said belt is wrapped around a first pulley disposed adjacent to a film winding member and a second pulley disposed adjacent to a film rewinding member.

* * * * *

UNITED STATES PATENT AND TRADEMARK OFFICE
CERTIFICATE OF CORRECTION

PATENT NO. : 5,911,088

DATED : June 8, 1999

INVENTOR(S) : Masaki HIGASHIHARA, et al.   Page 1 of 2

It is certified that error appears in the above-identified patent and that said Letters Patent is hereby corrected as shown below:

COLUMN 2:
    Line 2, "1200a a" should read --1200a--.

COLUMN 3:
    Line 8, "series of" should be delete.

COLUMN 5:
    Line 14, "view" should read --views--.

COLUMN 6:
    Line 13, "are" should read --is--.
    Line 38, "than" should read --than with--.

COLUMN 8:
    Line 57, "bushing" should read --bushings--.
    Line 62, "bushes" should read --bushings--.

COLUMN 9:
    Line 39, "apposite" should read --opposite--.
    Line 53, "to" should read --transmitted to--.

UNITED STATES PATENT AND TRADEMARK OFFICE
CERTIFICATE OF CORRECTION

PATENT NO. : 5,911,088

DATED : June 8, 1999

INVENTOR(S) : Masaki HIGASHIHARA, et al.

It is certified that error appears in the above-identified patent and that said Letters Patent is hereby corrected as shown below:

COLUMN 10:
    Line 12, "bushes" should read --bushings--.

COLUMN 11:
    Line 15, "each" should read --with each--.
    Line 65, "bushes" should read --bushings--.

COLUMN 12:
    Line 49, "apposite" should read --opposite--.

Signed and Sealed this

Fourteenth Day of March, 2000

Attest:

Q. TODD DICKINSON

*Attesting Officer*  *Commissioner of Patents and Trademarks*